US008164990B2

(12) United States Patent
Hamada et al.

(10) Patent No.: US 8,164,990 B2
(45) Date of Patent: Apr. 24, 2012

(54) RECORDING APPARATUS, RECORDING METHOD, RECORDING PROGRAM, RECORDING/REPRODUCING APPARATUS, RECORDING/REPRODUCING METHOD, RECORDING/REPRODUCING PROGRAM, EDITING APPARATUS, EDITING METHOD, EDITING PROGRAM, AND DISPLAY METHOD

(75) Inventors: Toshiya Hamada, Saitama (JP);
Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 690 days.

(21) Appl. No.: 11/695,946

(22) Filed: Apr. 3, 2007

(65) Prior Publication Data

US 2007/0248322 A1    Oct. 25, 2007

(30) Foreign Application Priority Data

Apr. 6, 2006  (JP) ................. 2006-105537

(51) Int. Cl.
*G11B 7/085*  (2006.01)
*H04N 7/00*  (2011.01)
(52) U.S. Cl. .................... 369/30.08; 386/241
(58) Field of Classification Search ................ 386/95,
386/241, 239; 369/30.03, 30.08; 711/112.4
See application file for complete search history.

(56) References Cited

U.S. PATENT DOCUMENTS

| 2002/0150383 | A1* | 10/2002 | Kato et al. ................. 386/69 |
| 2004/0223741 | A1* | 11/2004 | Yoo et al. ................. 386/95 |
| 2004/0264936 | A1* | 12/2004 | Yoo et al. ................. 386/95 |
| 2005/0105888 | A1 | 5/2005 | Hamada et al. |
| 2005/0175326 | A1* | 8/2005 | Kim et al. ................. 386/126 |
| 2005/0228940 | A1* | 10/2005 | Blacquiere et al. ........... 711/112 |
| 2005/0262116 | A1* | 11/2005 | Yoo et al. ................. 707/100 |
| 2005/0262149 | A1* | 11/2005 | Jung et al. ................. 707/104.1 |
| 2006/0039255 | A1* | 2/2006 | Seo et al. ................. 369/47.1 |

FOREIGN PATENT DOCUMENTS

| JP | 2002-150383 | 5/2002 |
| JP | 2004-80587 | 3/2004 |
| JP | 2004-304767 | 10/2004 |
| JP | 2005-32315 | 2/2005 |
| JP | 2008-48383 | 2/2007 |
| WO | WO 2004/008460 A1 | 1/2004 |

OTHER PUBLICATIONS

U.S. Appl. No. 11/916,466, filed Dec. 4, 2007, Hamada et al.
U.S. Appl. No. 11/695,205, filed Apr. 2, 2007, Hamada et al.
Office Action issued Feb. 22, 2011 in Japan Application No. 2006-105537.

* cited by examiner

*Primary Examiner* — Ali Neyzari
(74) *Attorney, Agent, or Firm* — Oblon, Spivak, McClelland, Maier & Neustadt, L.L.P.

(57) ABSTRACT

To provide a recording/reproducing apparatus for recording at least content data and reproduction control information for controlling reproduction of the content data on a recording medium and reproducing the data recorded on the recording medium. The recording/reproducing apparatus includes: a recording unit which records content data on a recording medium recorded on the recording medium; a reproducing unit which reproduces the data from the recording medium; and a control unit which makes a control to generate a clip information file, a PlayList file, an object file, and an index file, and which controls recording by the recording unit and reproduction by the reproducing unit.

29 Claims, 25 Drawing Sheets

Fig. 9

| SYNTAX | DATA LENGTH (BITS) | MNEMONIC |
|---|---|---|
| index.bdmv { | | |
|     type_indicator | 8 * 4 | bslbf |
|     version_number | 8 * 4 | bslbf |
|     Indexes_start_address | 32 | uimsbf |
|     ExtensionData_start_address | 32 | uimsbf |
|     reserved_for_future_use | 192 | bslbf |
|     AppInfoBDMV() | | |
|     for (i=0; i<N1; i++) { | | |
|         padding_word | 16 | bslbf |
|     } | | |
|     Indexes() | | |
|     for (i=0; i<N2; i++) { | | |
|         padding_word | 16 | bslbf |
|     } | | |
|     ExtensionData() | | |
|     for (i=0; i<N3; i++) { | | |
|         padding_word | 16 | bslbf |
|     } | | |
| } | | |

Fig. 10

| SYNTAX | DATA LENGTH (BITS) | MNEMONIC |
|---|---|---|
| Indexes() { | | |
|     length | 32 | uimsbf |
|     FirstPlayback() { | | |
|         '01' | 2 | uimsbf |
|         reserved | 30 | bslbf |
|         HDAVC_Title_playback_type | 2 | uimsbf |
|         reserved | 14 | bslbf |
|         FirstPlayback_mobj_id_ref | 16 | uimsbf |
|         reserved | 8 * 4 | bslbf |
|     } | | |
|     TopMenu() { | | |
|         '01' | 2 | uimsbf |
|         reserved | 30 | bslbf |
|         '01' | 2 | uimsbf |
|         reserved | 14 | bslbf |
|         TopMenu_mobj_id_ref | 16 | uimsbf |
|         reserved | 8 * 4 | bslbf |
|     } | | |
|     number_of_Titles | 16 | uimsbf |
|     for (title_id=0; title_id < number_of_Titles; title_id++) { | | |
|         Title[title_id]() { | | |
|             '01' | 2 | uimsbf |
|             reserved | 46 | bslbf |
|             Title_mobj_id_ref[title_id] | 16 | uimsbf |
|             reserved | 8 * 4 | bslbf |
|         } | | |
|     } | | |
| } | | |

*Fig. 11*

| SYNTAX | DATA LENGTH (BITS) | MNEMONIC |
|---|---|---|
| MovieObject.bdmv { | | |
|     type_indicator | 8 * 4 | bslbf |
|     version_number | 8 * 4 | bslbf |
|     ExtensionData_start_address | 32 | uimsbf |
|     reserved_for_future_use | 224 | bslbf |
|     MovieObjects() | | |
|     for (i=0; i<N1; i++) { | | |
|         padding_word | 16 | bslbf |
|     } | | |
|     ExtensionData() | | |
|     for (i=0; i<N2; i++) { | | |
|         padding_word | 16 | bslbf |
|     } | | |
| } | | |

Fig. 12

| SYNTAX | DATA LENGTH (BITS) | MNEMONIC |
|---|---|---|
| MovieObjects() { | | |
|   length | 32 | uimsbf |
|   reserved | 32 | bslbf |
|   number_of_mobjs | 16 | uimsbf |
|   for (mobj_id=0; mobj_id<number_of_mobjs; mobj_id++) { | | |
|     MovieObject[mobj_id]() { | | |
|       TerminalInfo() { | | |
|         '1' | 1 | bslbf |
|         '0' | 1 | bslbf |
|         '0' | 1 | bslbf |
|         reserved | 13 | bslbf |
|       } | | |
|       number_of_navigation_commands[mobj_id] | 16 | uimsbf |
|       for (command_id=0; command_id<number_of_navigation_commands[mobj_id]; command_id++){ | | |
|         navigation_command[mobj_id][command_id] | 96 | bslbf |
|       } | | |
|     } | | |
|   } | | |
| } | | |

*Fig. 13*

| SYNTAX | DATA LENGTH (BITS) | MNEMONIC |
|---|---|---|
| ExtensionData() { | | |
|     length | 32 | uimsbf |
|     if(length !=0){ | | |
|         data_block_start_address | 32 | uimsbf |
|         reserved_for_word_align | 24 | bslbf |
|         number_of_ext_data_entries | 8 | uimsbf |
|         for (i=0; i<*number_of_ext_data_entries*; i++) { | | |
|             ext_data_entry() { | | |
|                 ID1 | 16 | uimsbf |
|                 ID2 | 16 | uimsbf |
|                 ext_data_start_address | 32 | uimsbf |
|                 ext_data_length | 32 | uimsbf |
|             } | | |
|         } | | |
|         for (i=0; i<L1; i++) { | | |
|             padding_word | 16 | bslbf |
|             padding_word | 16 | bslbf |
|         } | | |
|         data_block() | 32+ 8 * (length - data_block_start _address) | |
|     } | | |
| } | | |

Fig. 17

| SYNTAX | DATA LENGTH (BITS) | MNEMONIC |
|---|---|---|
| IndexExtensionData(){ | | |
|     type_indicator | 8 * 4 | uimsbf |
|     reserved | 8 * 4 | bslbf |
|     TableOfPlayLists_start_address | 32 | uimsbf |
|     MakersPrivateData_start_address | 32 | uimsbf |
|     reserved_for_future_use | 192 | bslbf |
|     UIAppInfoHDAVC() | | |
|     for(i=0; i< N1;i++) { | | |
|         padding_word | 16 | bslbf |
|     } | | |
|     TableOfPlayLists() | | |
|     for(i=0; i< N2;i++) { | | |
|         padding_word | 16 | bslbf |
|     } | | |
|     MakersPrivateData() | | |
|     for (i=0; i< N3;i++){ | | |
|         padding_word | 16 | bslbf |
|     } | | |
| } | | |

Fig. 18

| SYNTAX | DATA LENGTH (BITS) | MNEMONIC |
|---|---|---|
| TableOfPlayLists() { | | |
|     length | 32 | uimsbf |
|     number_of_PlayLists | 16 | bslbf |
|     for(i=0; i< number_of_PlayLists;i++){ | | |
|         PlayList_file_name | 8 * 5 | bslbf |
|         reserved_for_future_use | 6 | bslbf |
|         PlayList_attribute | 2 | uimsbf |
|         reserved_for_future_use | 16 | bslbf |
|         title_id_ref | 16 | uimsbf |
|     } | | |
| } | | |

RECORDING APPARATUS, RECORDING METHOD, RECORDING PROGRAM, RECORDING/REPRODUCING APPARATUS, RECORDING/REPRODUCING METHOD, RECORDING/REPRODUCING PROGRAM, EDITING APPARATUS, EDITING METHOD, EDITING PROGRAM, AND DISPLAY METHOD

CROSS REFERENCES TO RELATED APPLICATIONS

The present invention contains subject matter related to Japanese Patent Application JP 2006-105537 filed in the Japanese Patent Office on Apr. 6, 2006, the entire contents of which being incorporated herein by reference.

BACKGROUND OF THE INVENTION

1. Field of the Invention

The present invention relates to a recording apparatus, a recording method, a recording program, a recording/reproducing apparatus, a recording/reproducing method, a recording/reproducing program, an editing apparatus, an editing method, an editing program, and a display method that are allowed to have compatibility with a recording medium that is recorded by using a format that has audio/video (AV) streams, reproduction control information indicating a reproduction section, a reproduction sequence and the like of the AV streams, an object for specifying the reproduction control information, and a table in which a title for calling the object is to be described, to thereby easily create and display a menu screen.

The present invention can be applied to a recording apparatus, a recording method, a recording program, a recording/reproducing apparatus, a recording/reproducing method, a recording/reproducing program, an editing apparatus, an editing method, an editing program, and a display method that are allowed to have compatibility with, for example, a "Blu-ray Disc Read-Only Format" that serves a read-only format for a Blu-ray Disc (registered trademark) to thereby easily create and display a menu screen.

2. Description of the Related Art

In recent years, a Blu-ray Disc standard has been proposed as a standard for a disc-type recording medium that is recordable and removable from a recording/reproducing apparatus. In the Blu-ray Disc standard, a disc of 12 cm in diameter and 0.1 mm in cover layer thickness is used as a recording medium and a blue-violet laser of 405 nm in wavelength and an objective lens of 0.85 in numerical aperture are used as optical systems, thereby achieving a recording capacity of a maximum of 27 GB (Gigabytes). This makes it possible to record a BS digital high resolution broadcast in Japan for 2 hours or more without degrading an image quality.

Sources (supply sources) of audio/video (AV) signals to be recorded on this recordable optical disc are assumed to be those which use analog signals in accordance with analog television broadcasting as an example of the related art; and those which use digital signals in accordance with, for example, digital television broadcasting including a BS digital broadcasting. In the Blu-ray Disc standard, a standard defining a method for recording AV signals broadcast on these broadcasting has already been set.

On the other hand, activity of developing a read-only recording medium having a movie or music recorded therein in advance is underway as a current Blu-ray Disc derived standard. A digital versatile disc (DVD) has already been well known as a disc-shaped recording medium for recording a movie or music. A read-only optical disc under the Blu-ray Disc standard is greatly different from the existing DVD and is advantageous in that a high resolution picture can be recorded with a high image quality for 2 hours or more by utilizing a mass capacity and a high speed transfer speed of the Blu-ray Disc.

Hereinafter, a standard for a read-only recording medium for the Blu-ray Disc is referred to as a BD-ROM (Blu-ray Disc-Read Only Memory). In addition, a standard for a recordable recording medium for the Blu-Ray Disc is referred to as a BD-RE. Japanese Patent Application Laid-Open (JP-A) No. 2004-21886 describes the standard for the BD-ROM that serves as a read-only type Blu-ray Disc.

In the BD-ROM standard, video data is recorded in units of clips, and a reproducing section can be specified in a clip using a movie PlayList (MoviePlayList). Here, a set of data serving as unit, which is necessary to be reproduced continuously and synchronously i.e., reproduced in real time is guaranteed, is referred to as a clip. For example, video data that exists as one file on a recording medium is handled as a clip. The movie PlayList can specify a reproducing start point (IN point) and a reproducing end point (OUT point) for each of a plurality of clips and can specify a reproducing section and a reproducing sequence of each of the plurality of clips.

The movie PlayList (hereinafter, abbreviated as PlayList) is specified by a navigation command in a MovieObject (MovieObject), and then, reproduced. A reference to the MovieObject is enumerated in an index table as an entrance for a title. The index table is data that is first read when a disc is mounted on a player, and a user can see a title described in the index table when the disc is mounted.

In the BD-ROM standard, a design is made so as to arbitrarily set a reference relationship between clips and PlayLists. For example, reference can be made to a certain clip from two PlayLists that are different from each other in IN point and OUT point. Further, a reference relationship between titles and MovieObjects can also be arbitrarily set.

FIG. 1 schematically depicts an exemplary relationship among titles, MovieObjects and PlayLists based on the BD-ROM standard. When a disc is mounted on a player, a first playback (FirstPlayback) and a top menu (TopMenu) on an index table are read, and a trailer or a TopMenu is reproduced based on the MovieObjects described in the FirstPlayback or the TopMenu. A user can instruct reproduction of each title recorded on the disc from the TopMenu.

In this example of FIG. 1, a MovieObject #4 is specified by the FirstPlayback and TopMenu, a PlayList #100 and a PlayList #101 are referenced from MovieObject #4, and a menu screen of FirstPlayback and TopMenu is displayed.

In other words, this example of FIG. 1 is obtained as a scenario configuration such that a menu screen is first displayed by the MovieObject #4; when the display of the menu screen finishes, reproducing by the MovieObject #0 is started; if a title jump, for example, is selected while the menu screen is displayed, MovieObject #4 jumps to the Title #1; and then, reproduce by MovieObject #0 is started from the jumped title.

The TopMenu navigates reproduction of six titles: Title #1 to Title #6. Title #1 and Title #3 each instructs reproduction by MovieObject #0, and Title #4 and Title #6 each instructs reproduction by a MovieObject #2. In addition, a MovieObject #4 for reproducing the TopMenu jumps to Title #1 and jumps to MovieObject #0 referenced by Title #1. Further, a command for reproducing two PlayLists: PlayList #100 and PlayList #101 is described in MovieObject #0, and a command for reproducing three PlayLists: PlayList #4, PlayList #5, and PlayList #6 is described in a MovieObject #3.

As described above, in the BD-ROM standard, it is possible to perform a reproduction instruction from a plurality of titles to one MovieObject; a jump from one MovieObject to a title and a MovieObject; a reproduction instruction from one MovieObject to a plurality of PlayLists; and the like. In this manner, there is an advantageous effect that the intention of a content producer is easily achieved by enabling an arbitrary reference relationship among titles, MovieObjects, PlayLists and the like.

SUMMARY OF THE INVENTION

In the meantime, there has been prevalent a DVD recorder capable of recording audio/video (AV) data in a recordable DVD by using a DVD-Video (Digital Versatile Disc-Video) standard specified for a read-only recording medium, that has existed in the past. In view of this fact, it is currently assumed that the BD-RPM standard developed as a standard relevant to a read-only recording medium is used as one of recording schemes of commercially available recorders in the future. Thus, the development of a standard is underway such that the BD-ROM standard is extended to a recordable recording medium.

Even when the BD-ROM standard is extended to a recordable recording medium, it is better for a title recorded on a disc to be specified from a TopMenu reproduced in accordance with a description of an index table to thereby start reproduction. In addition, in the recordable recording medium, there is a need for enabling title editing such as title deletion or addition.

For example, when the recording medium is used for a video camera, a button such as photography button is pressed to start photography, so that recording of a new clip is started. When photography is finished by, for example, an operation of releasing the photography button to thereby finish recording of a clip, a title corresponding to the clip is added. Similarly, if a recorded clip is deleted, a title corresponding thereto is also deleted.

Here, let us consider a case in which titles are managed while title indices are assigned in the sequential order of recording clips, for example. In this case, there are two title management methods; i.e., a first management method for maintaining a title number regardless of title editing and a second management method for, at the time of title editing, maintaining a sequential order of title recording as well as changing title indices in response to the editing.

Let us consider a case in which a title #1, a title #2, a title #3, and a title #4 exist, as an example is shown in FIG. 2A. When among them, the title #2 has been deleted by means of editing, the respective title indices are maintained and the deleted title #2 is missing in the first management method, as an example is shown in FIG. 2B. In the second management method, on the other hand, title indices that follow the deleted title #2 are shifted sequentially with respect to the title #2, as an example is shown in FIG. 2C. In the example of FIG. 2C, the title #3 and title #4 that exist before editing are defined as new titles #2 and #3 that exist after editing, respectively.

Which of the first and second management methods is mounted on a recorder is determined depending on, for example, a design concept for the recorder.

In this case, however, there has been a problem that compatibility in a menu screen etc. may not be maintained between a recorder having the first management method mounted thereon and a recorder having the second management method mounted thereon.

For example, if a menu screen created based on the first management method is reproduced in an apparatus having the second management method mounted thereon with reference to FIGS. 2A to 2C described above, a contradiction may occur such that a menu corresponding to the title #4 of FIG. 2B is not displayed. Similarly, if a menu screen created based on the second management method is reproduced in an apparatus having the first management method mounted thereon, a contradiction may occur such that the title #2 of FIG. 2C is not reproduced in spite of the fact that the title #2 is displayed on a menu.

Therefore, it is desirable to provide a recording apparatus, a recording method, a recording program, a recording/reproducing apparatus, a recording/reproducing method, a recording/reproducing program, an editing apparatus, an editing method, an editing program and a display method, which allow, in the case where the BD-ROM standard is extended to a recordable recording medium, a system of maintaining a title number regardless of title editing to be compatible with a system of maintaining a sequential order of recording titles at the time of title editing to thereby change the title number in response to the editing.

According to a first embodiment of the present invention, there is provided a recording/reproducing apparatus for recording at least content data and reproduction control information for controlling reproduction of the content data on a recording medium and reproducing the data recorded on the recording medium, the recording/reproducing apparatus including: a recording unit which records content data on a recording medium; a reproducing unit which reproduces the data from the recording medium; and a control unit which makes a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, and which controls recording by the recording unit and reproduction by the reproducing unit, wherein the control unit controls the recording unit so as to, in response to recording of the content data on the recording medium, generate a table for storing information that indicates the titles to which the PlayList files belong at the time of generation of the PlayList files in the sequential order of recording the PlayList files with respect to each of the PlayList files, and to record the clip information file, the PlayList file, the object file, the index file, and the table on the recording medium; and when at the time of reproducing the content data from the recording medium by means of the reproducing unit, an arrangement of the titles on the index table, read out from the recording medium, does not correspond to an arrangement of information stored in the table and indicating the titles on the PlayList file other than the PlayList file for reproducing a menu, the control unit controls reproduction of the PlayLists included in the PlayList file to be performed in response to the arrangement of the titles on the index table.

According to a second embodiment of the present invention, there is provided a recording/reproducing method for recording at least content data and reproduction control information for controlling reproduction of the content data on a recording medium and reproducing the data recorded on the recording medium, the recording/reproducing method including the steps of: recording content data on a recording medium; reproducing the data from the recording medium; and making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, and controlling recording by the recording step and reproduction by the reproduction step, wherein the control step controls the recording step so as to, in response to recording of the content data on the recording medium, generate a table for storing information that indicates the titles to which the PlayList files belong at the time of generation of the PlayList files in the sequential order of recording the PlayList files with respect to each of the PlayList files, and to record the clip information file, the PlayList file, the object file, the index file, and the table on the recording medium; and when at the time of reproducing the content data from the recording medium by means of the reproduction step, an arrangement of the titles on the index table, read out from the recording medium, does not correspond to an arrangement of information stored in the table and indicating the titles on the PlayList file other than the PlayList file for reproducing a menu, the control step controls reproduction of the PlayLists included in the PlayList file to be performed in response to the arrangement of the titles on the index table.

According to a third embodiment of the present invention, there is provided a recording/reproducing program which causes a computer to execute a recording/reproducing method for recording at least content data and reproduction control information for controlling reproduction of the content data on a recording medium and reproducing the data recorded on the recording medium, the recording/reproducing method including the steps of: recording content data on a recording medium; reproducing the data from the recording medium; and making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, and controlling recording by the recording step and reproduction by the reproduction step, wherein the control step controls the recording step so as to, in response to recording of the content data on the recording medium, generate a table for storing information that indicates the titles to which the PlayList files belong at the time of generation of the PlayList files in the sequential order of recording the PlayList files with respect to each of the PlayList files, and to record the clip information file, the PlayList file, the object file, the index file, and the table on the recording medium; and when at the time of reproducing the content data from the recording medium by means of the reproduction step, an arrangement of the titles on the index table, read out from the recording medium, does not correspond to an arrangement of information stored in the table and indicating the titles on the PlayList file other than the PlayList file for reproducing a menu, the control step controls reproduction of the PlayLists included in the PlayList file to be performed in response to the arrangement of the titles on the index table.

According to a fourth embodiment of the present invention, there is provided a recording apparatus for recording at least content data and reproduction control information for controlling reproduction of the content data on a recording medium, the recording apparatus including: a recording unit which records content data on a recording medium; and a control unit which makes a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, wherein the control unit makes a control to generate a table for storing information that indicates the titles to which the PlayList files belong at the time of generation of the PlayList files in the sequential order of recording the PlayList files with respect to each of the PlayList files; and when an arrangement of the titles on the index table does not correspond to an arrangement of information stored in the table and indicating the titles on the PlayList file other than the PlayList file for reproducing a menu, the control unit controls the arrangement of the titles on the index table to be changed based on the information stored in the table and indicating the titles to which the PlayList files belong at the time of generation of the PlayList files.

According to a fifth embodiment of the present invention, there is provided a recording method for recording at least content data and reproduction control information for controlling reproduction of the content data on a recording medium, the recording method including: making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title for calling the object is to be described; making a control to generate a table for storing information that indicates the titles to which the PlayList files belong at the time of generation of the PlayList files in the sequential order of recording the PlayList files with respect to each of the PlayList files; and when an arrangement of the titles on the index table does not correspond to an arrangement of information stored in the table and indicating the titles on the PlayList file other than the PlayList file for reproducing a menu, controlling the arrangement of titles on the index table to be changed based on the information stored in the table and indicating the titles to which the PlayList files belong at the time of generation of the PlayList files.

According to a sixth embodiment of the present invention, there is provided a recording program which causes a computer to execute a recording method for recording at least content data and reproduction control information for controlling reproduction of the content data on a recording medium, the recording method including: making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title for calling the object is to be described; making a control to generate a table for storing information that indicates the titles to which the PlayList files belong at the time of generation of the PlayList files in the sequential order of recording the PlayList files with respect to each of the PlayList files; and when an arrangement of the titles on the index table does not correspond to an arrangement of information stored in the table and indicating the titles on the PlayList file other than the PlayList file for reproducing a menu, controlling the arrangement of titles on the index table to be changed based on the information stored in the table and indicating the titles to which the PlayList files belong at the time of generation of the PlayList files.

According to a seventh embodiment of the present invention, there is provided a recording apparatus for recording at least content data and reproduction control information for controlling reproduction of the content data on a recording medium, the recording apparatus including: a recording unit which records content data on a recording medium; and a control unit which makes a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, wherein the control unit makes a control to generate a table for storing information that indicates the titles to which the PlayList files belong at the time of generation of the PlayList files in the sequential order of recording the PlayList files with respect to each of the PlayList files; and when, based on the information stored in the table and indicating the titles, it is determined that there is a title of which number is missing with respect to the generated PlayList file in an arrangement of the titles on the index table, the control unit makes a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

According to an eighth embodiment of the present invention, there is provided a recording method for recording at least content data and reproduction control information for controlling reproduction of the content data on a recording medium, the recording method including: making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table a title of calling the object is to be described; making a control to generate a table for storing information that indicates the titles to which the PlayList files belong at the time of generation of the PlayList files in the sequential order of recording the PlayList files with respect to each of the PlayList files; and when, based on the information stored in the table and indicating the titles, it is determined that there is a title of which number is missing with respect to the generated PlayList file in an arrangement of the titles on the index table, making a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

According to a ninth embodiment of the present invention, there is provided a recording program which causes a computer to execute a recording method for recording at least content data and reproduction control information for controlling reproduction of the content data on a recording medium, the recording method including: making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title for calling the object is to be described; making a control to generate a table for storing information that indicates the titles to which the PlayList files belong at the time of generation of the PlayList files in the sequential order of recording the PlayList files with respect to each of the PlayList files; and when, based on the information stored in the table and indicating the titles, it is determined that there is a title of which number is missing with respect to the generated PlayList file in an arrangement of the titles on the index table, making a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

According to a tenth embodiment of the present invention, there is provided an editing apparatus for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the editing apparatus including: a control unit which controls, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to each of the PlayList files, wherein, when an arrangement of the titles on the index table does not correspond to an arrangement of information stored in the table and indicating the titles on the PlayList file other than the PlayList file for reproducing a menu, the control unit controls reproduction of the PlayLists included in the PlayList file to be performed in response to the arrangement of the titles on the index table.

According to an eleventh embodiment of the present invention, there is provided an editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the editing method including: controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to each of the PlayList files; and when an arrangement of the titles on the index table does not correspond to an arrangement of information stored in the table and indicating the titles on the PlayList file other than the PlayList file for reproducing a menu, controlling reproduction of the PlayLists included in the PlayList file to be performed in response to the arrangement of the titles on the index table.

According to a twelfth embodiment of the present invention, there is provided an editing program which causes a computer to execute an editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the editing method including: controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to each of the PlayList files; and when an arrangement of the titles on the index table does not correspond to an arrangement of information stored in the table and indicating the titles on the PlayList file other than the PlayList file for reproducing a menu, controlling reproduction of the PlayLists included in the PlayList file to be performed in response to the arrangement of the titles on the index table.

According to a thirteenth embodiment of the present invention, there is provided an editing apparatus for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the editing apparatus including: a control unit which controls, with respect to content data, in an editable manner a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, wherein, when an arrangement of the titles on the index table does not correspond to an arrangement of information stored in the table and indicating the titles on the PlayList file other than the PlayList file for reproducing a menu, the control unit controls the arrangement of the titles on the index table to be changed based on the information stored in the table and indicating titles to which the PlayList files belong at the time of generation of the PlayList files.

According to a fourteenth embodiment of the present invention, there is provided an editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the editing method including: controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to each of the PlayList files; and when an arrangement of the titles on the index table does not correspond to an arrangement of information indicating the titles on the PlayList file other than the PlayList file for reproducing a menu, stored in the table, controlling the arrangement of the titles on the index table to be changed based on the information stored in the table and indicating titles to which the PlayList files belong at the time of generation of the PlayList files.

According to a fifteenth embodiment of the present invention, there is provided an editing program which causes a computer to execute an editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the editing method including: controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to each of the PlayList files; and when an arrangement of the titles on the index table does not correspond to an arrangement of information stored in the table and indicating the titles on the PlayList file other than the PlayList file for reproducing a menu, controlling the arrangement of the titles on the index table to be changed based on the information stored in the table and indicating titles to which the PlayList files belong at the time of generation of the PlayList files.

According to a sixteenth embodiment of the present invention, there is provided an editing apparatus for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the editing apparatus including: a control unit which controls, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to each of the PlayList files, wherein, when, based on the information stored in the table and indicating the titles, it is determined that there is a title of which number is missing with respect to the generated PlayList file in an arrangement of the titles on the index table, the control unit makes a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

According to a seventeenth embodiment of the present invention, there is provided an editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the editing method including: controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to each of the PlayList files; and when, based on the information stored in the table and indicating the titles, it is determined that there is a title of which number is missing with respect to the generated PlayList file in an arrangement of the titles on the index table, making a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

According to an eighteenth embodiment of the present invention, there is provided an editing program which causes a computer to execute an editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the editing method including: controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to each of the PlayList files; and when, based on the information stored in the table and indicating the titles, it is determined that there is a title of which number is missing with respect to the generated PlayList file in an arrangement of the titles on the index table, making a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

According to a nineteenth embodiment of the present invention, there is provided a display control apparatus including a display control unit which controls titles to be displayed based on a data structure that includes; content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, wherein, when an arrangement of the titles on the index table does not correspond to an arrangement of information stored in the table and indicating the titles on the PlayList file other than the PlayList file for reproducing a menu, the display control unit controls a list of the titles to be displayed in accordance with the arrangement of the titles on the index table.

According to a twentieth embodiment of the present invention, there is provided a display control method for controlling titles to be displayed based on a data structure that includes content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the display control method including: when an arrangement of the titles on the index table does not correspond to an arrangement of information stored in the table and indicating the titles on the PlayList file other than the PlayList file for reproducing a menu, controlling a list of the titles to be displayed in accordance with the arrangement of the titles on the index table.

According to a twenty-first embodiment of the present invention, there is provided a display control apparatus including a display control unit which controls titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, wherein, when an arrangement of the titles on the index table does not correspond to an arrangement of information stored in the table and indicating the titles on the PlayList file other than the PlayList file for reproducing a menu, the display control unit controls the arrangement of the titles on the index table to be changed based on the information indicating the titles to which the PlayList files belong at the time of generation of the PlayList files and also controls a list of the titles to be displayed in accordance with the changed arrangement of the titles on the index table.

According to a twenty-second embodiment of the present invention, there is provided a display control method for controlling titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the display control method including: when an arrangement of the titles on the index table does not correspond to an arrangement of information stored in the table and indicating the titles on the PlayList file other than the PlayList file for reproducing a menu, controlling the arrangement of the titles on the index table to be changed based on the information indicating the titles to which the PlayList files belong at the time of generation of the PlayList files and also controls a list of the titles to be displayed in accordance with the changed arrangement of the titles on the index table.

According to a twenty-third embodiment of the present invention, there is provided a display control apparatus including a display control unit which controls titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, wherein, when, based on the information stored in the table and indicating the titles, it is determined that there is a title of which number is missing with respect to the generated PlayList file in an arrangement of the titles on the index table, the control unit makes a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title; and the display control unit controls a list of the titles and the title of which number is missing to be displayed in the sequential order based on the information stored in the table and indicating the titles to which the PlayList files belong at the time of generation of the PlayList files.

According to a twenty-fourth embodiment of the present invention, there is provided a display control method for controlling titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files, the display control method including: when, based on the information stored in the table and indicating the titles, it is determined that there is a title of which number is missing with respect to the generated PlayList file in an arrangement of the titles on the index table, making a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title; and controlling a list of the titles and the title of which number is missing to be displayed in the sequential order based on the information stored in the table and indicating the titles to which the PlayList files belong at the time of generation of the PlayList files.

As described above, the first, second and third embodiments of the present invention include a control step of making a control to generate a clip information file that includes clip information indicating attribute information on content data, a PlayList file that includes a PlayList for calling the clip information, an object file that includes an object indicating a method for reproducing the content data for calling the PlayList, and an index file that includes an index table in which a title of calling the object is to be described, with respect to content data recorded on a recording medium; and controlling recording by a recording step and reproduction by a reproduction step. The control step makes a control to, in response to recording of the content data on the recording medium, generate a table for storing information indicating the titles to which the PlayList files belong at the time of generation of the PlayList files in the sequential order of recording the PlayList files with respect to each of the PlayList files, and to record the clip information file, the PlayList file, the object file, the index file, and the table on the recording medium. When, at the time of reproducing the content data from the recording medium, an arrangement of the titles on the index table, read out from the recording medium, does not correspond to an arrangement of information stored in the table and indicating the titles on the PlayList file other than the PlayList file for reproducing a menu, the control step controls reproduction of the PlayLists included in the PlayList file to be performed in response to the arrangement of the titles on the index table. Consequently, even if a title is deleted at the time of or after creation of a PlayList file, titles can be selected and reproduced.

According to the fourth, fifth and sixth embodiments of the present invention, a control is made to generate a clip information file that includes clip information indicating attribute information on content data, a PlayList file that includes a PlayList for calling the clip information, an object file that includes an object indicating a method for reproducing the content data for calling the PlayList, and an index file that includes an index table in which a title for calling the object is to be described, with respect to content data recorded on a recording medium. Also, a control is made to generate a table for storing information that indicates the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, the arrangement of titles on the index table is controlled to be changed based on the information stored in the table and indicating the titles to which the PlayList files belong at the time of generation of the PlayList files. As a consequence, even if a title is deleted at the time of or after creation of a PlayList file, titles can be reproduced while a sequential order of recording is maintained.

According to the seventh, eighth and ninth embodiments of the present invention, a control is made to generate a clip information file that includes clip information indicating attribute information on content data, a PlayList file that includes a PlayList for calling the clip information, an object file that includes an object indicating a method for reproducing the content data for calling the PlayList, and an index file that includes an index table in which a title of calling the object is to be described, with respect to content data recorded on a recording medium. Also, a control is made to generate a table for storing information that indicates the titles to which the PlayList files belong at the time of generation of the PlayList files in the sequential order of recording the PlayList files with respect to each of the PlayList files. When, based on the information stored in the table and indicating the titles, it is determined that there is a title of which number is missing with respect to the generated PlayList file in an arrangement of the titles on the index table, a control is made to generate the title of which number is missing in accordance with the sequential order of recording the PlayList files based on the information indicating the titles to which the PlayList files belong at the time of generation of the PlayList files, and to newly generate the object and the PlayList file that correspond to the generated title. With this constitution, a title deleted at the time of or after creation of a PlayList file, can be known.

The tenth, eleventh and twelfth embodiments of the present invention are directed to controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, reproduction of the PlayLists included in the PlayList file is controlled to be performed in response to the arrangement of the titles on the index table. Accordingly, even if a title is deleted at the time of or after creation of a PlayList file, titles can be selected and reproduced.

The thirteenth, fourteenth and fifteenth embodiments of the present invention are directed to controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, the arrangement of the titles on the index table is controlled to be changed based on the information stored in the table and indicating the titles to which the PlayList files belong at the time of generation of the PlayList files. As a consequence, even if a title is deleted at the time of or after creation of a PlayList file, titles can be reproduced while a sequential order of recording is maintained.

The sixteenth, seventeenth and eighteenth embodiments of the present invention are directed to controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to each of the PlayList files. When, based on the information stored in the table and indicating the titles, it is determined that there is a title of which number is missing with respect to the generated PlayList file in an arrangement of the titles on the index table, a control is made to generate the title of which number is missing in accordance with the sequential order of recording the PlayList files based on the information indicating the titles to which the PlayList files belong at the time of generation of the PlayList files, and to newly generate the object and the PlayList file that correspond to the generated title. This makes it possible to know a title deleted at the time of or after creating of a PlayList file.

The nineteenth and twentieth embodiments of the present invention are directed to controlling titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, a list of the titles is controlled to be displayed in accordance with the arrangement of the titles on the index table. This constitution allows a menu for selecting titles to be displayed even if a title is deleted at the time of or after creation of a PlayList file.

The twenty-first and twenty-second embodiments of the present invention are directed to controlling titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, the arrangement of the titles on the index table is controlled to be changed based on the information indicating the titles to which the PlayList files belong at the time of generation of the PlayList files, and a list of the titles is controlled to be displayed in accordance with the changed arrangement of the titles on the index table. Accordingly, even if a title is deleted at the time of or after creation of a PlayList file, a menu having maintained thereon sequential order of recording titles can be displayed.

The twenty-third and twenty-fourth embodiments of the present invention are directed to controlling titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files. When, based on the information stored in the table and indicating the titles, it is determined that there is a title of which number is missing with respect to the generated PlayList file in an arrangement of the titles on the index table, a control is made to generate the title of which number is missing in accordance with the sequential order of recording the PlayList files based on the information indicating the titles to which the PlayList files belong at the time of generation of the PlayList files, and to newly generate the object and the PlayList file that correspond to the generated title. Also, a control is made to display a list of the titles and the title of which number is missing in the sequential order based on the information stored in the table and indicating the titles to which the PlayList files belong at the time of generation of the PlayList files. This makes it possible to display a title deleted at the time of or after creation of a PlayList file.

The first, second and third embodiments of the present invention, as described above, include a control step of making a control to generate a clip information file that includes clip information indicating attribute information on content data, a PlayList file that includes a PlayList for calling the clip information, an object file that includes an object indicating a method for reproducing the content data for calling the PlayList, and an index file that includes an index table in which a title of calling the object is to be described, with respect to content data recorded on a recording medium; and controlling recording by a recording step and reproduction by a reproduction step. The control step makes a control to, in response to recording of the content data on the recording medium, generate a table for storing information indicating the titles to which the PlayList files belong at the time of generation of the PlayList files in the sequential order of recording the PlayList files with respect to each of the PlayList files, and to record the clip information file, the PlayList file, the object file, the index file, and the table on the recording medium. When at the time of reproducing the content data from the recording medium, an arrangement of the titles on the index table, read out from the recording medium, does not correspond to an arrangement of information stored in the table and indicating the titles on the PlayList file other than the PlayList file for reproducing a menu, the controlling step controls reproduction of the PlayLists included in the PlayList file to be performed in response to the arrangement of the titles on the index table. Consequently, there is attained an advantageous effect that, even if a title is deleted at the time of or after creation of a PlayList file, titles can be selected and reproduced.

According to the fourth, fifth and sixth embodiments of the present invention, as described above, a control is made to generate a clip information file that includes clip information indicating attribute information on content data, a PlayList file that includes a PlayList for calling the clip information, an object file that includes an object indicating a method for reproducing the content data for calling the PlayList, and an index file that includes an index table in which a title for calling the object is to be described, with respect to content data recorded on a recording medium. Also, a control is made to generate a table for storing information that indicates the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, the arrangement of the titles on the index table is controlled to be changed based on the information stored in the table and indicating the titles to which the PlayList files belong at the time of generation of the PlayList files. Thus, there is attained an advantageous effect that, even if a title is deleted at the time of or after creation of a PlayList file, titles can be reproduced while a sequential order of recording is maintained.

According to the seventh, eighth and ninth embodiments of the present invention, as described above, a control is made to generate a clip information file that includes clip information indicating attribute information on content data, a PlayList file that includes a PlayList for calling the clip information, an object file that includes an object indicating a method for reproducing the content data for calling the PlayList, and an index file that includes an index table in which a title of calling the object is to be described, with respect to content data recorded on a recording medium. Also, a control is made to generate a table for storing information that indicates the titles to which the PlayList files belong at the time of generation of the PlayList files in the sequential order of recording the PlayList files with respect to each of the PlayList files. When, based on the information stored in the table and indicating the titles, it is determined that there is a title of which number is missing with respect to the generated PlayList file in an arrangement of the titles on the index table, a control is made to generate the title of which number is missing in accordance with the sequential order of recording the PlayList files based on the information indicating the titles to which the PlayList files belong at the time of generation of the PlayList files, and to newly generate the object and the PlayList file that correspond to the generated title. This constitution provides an advantageous effect that a title deleted at the time of or after creation of a PlayList file, can be known.

The tenth, eleventh and twelfth embodiments of the present invention, as described above, are directed to controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, reproduction of the PlayLists included in the PlayList file is controlled to be performed in response to the arrangement of the titles on the index table. As a consequence, there is attained an advantageous effect that, even if a title is deleted at the time of or after creation of a PlayList file, titles can be selected and reproduced.

The thirteenth, fourteenth and fifteenth embodiments of the present invention, as described above, are directed to controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, the arrangement of the titles on the index table is controlled to be changed based on the information stored in the table and indicating titles to which the PlayList files belong at the time of generation of the PlayList files. Accordingly, an advantageous effect can be attained that, even if a title is deleted at the time of or after creation of a PlayList file, titles can be reproduced while a sequential order of recording is maintained.

The sixteenth, seventeenth and eighteenth embodiments of the present invention, as described above, are directed to controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to each of the PlayList files. When, based on the information stored in the table and indicating the titles, it is determined that there is a title of which number is missing with respect to the generated PlayList file in an arrangement of the titles on the index table, a control is made to generate the title of which number is missing in accordance with the sequential order of recording the PlayList files based on information indicating the titles to which the PlayList files belong at the time of generation of the PlayList files, and to newly generate the object and the PlayList file that correspond to the generated title. Thus, there is attained an advantageous effect that a title deleted at the time of or after creating of a PlayList file, can be known.

The nineteenth and twentieth embodiments of the present invention, as described above, are directed to controlling titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, a list of the titles is controlled to be displayed in accordance with the arrangement of the titles on the index table. An advantageous effect is thus attained that a menu for selecting titles can be displayed even if a title is deleted at the time of or after creation of a PlayList file.

The twenty-first and twenty-second embodiments of the present invention, as described above, are directed to controlling titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files. When an arrangement of the titles on the index table does not correspond to an arrangement of information stored in the table and indicating the titles on the PlayList file other than the PlayList file for reproducing a menu, the arrangement of the titles on the index table is controlled to be changed based on the information indicating the titles to which the PlayList files belong at the time of generation of the PlayList files, and a list of the titles is controlled to be displayed in accordance with the changed arrangement of the titles on the index table. With this constitution, there is attained an advantageous effect that, even if a title is deleted at the time of or after creation of a PlayList file, a menu having maintained thereon sequential order of recording titles can be displayed.

The twenty-third and twenty-fourth embodiments of the present invention, as described above, are directed to controlling titles to be displayed based on a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to each of the PlayList files. When, based on the information stored in the table and indicating the titles, it is determined that there is a title of which number is missing with respect to the generated PlayList file in an arrangement of the titles on the index table, a control is made to generate the title of which number is missing in accordance with the sequential order of recording the PlayList files based on the information indicating the titles to which the PlayList files belong at the time of generation of the PlayList files, and to newly generate the object and the PlayList file that correspond to the generated title. Also, a list of the titles and the title of which number is missing is controlled to be displayed in the sequential order based on the information stored in the table and indicating the titles to which the PlayList files belong at the time of generation of the PlayList files. This provides an advantageous effect that a title deleted at the time of or after creation of a PlayList file, can be displayed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 9 is a schematic diagram depicting a syntax that represents an exemplary structure of a file "index.bdmv";

FIG. 10 is a schematic diagram depicting a syntax that represents an exemplary structure of a block Indexes( );

FIG. 11 is a schematic diagram depicting a syntax that represents an exemplary structure of a file "MovieObject.bdmv";

FIG. 12 is a schematic diagram depicting a syntax that represents an exemplary structure of a block MovieObject( );

FIG. 13 is a schematic diagram depicting a syntax that represents an exemplary structure of a block Extension Data( );

FIG. 17 is a schematic diagram depicting a syntax that represents an exemplary structure of a block data_block( ) in a field ExtensionData( ) contained in a file "index.bdmv";

FIG. 18 is a schematic diagram showing a syntax that represents an exemplary structure of a block TableOfPlayLists( );

DETAILED DESCRIPTION OF THE INVENTION

Hereinafter, one embodiment of the present invention will be described with reference to the accompanying drawings. For the sake of clear understanding, a brief description regarding to Blu-ray Disk will be given to an applicable part of "Blu-ray Read Only Format Ver 1.0 Part 3 Audio Visual Specifications" specifying a structure of managing contents, i.e., audio/video (AV) data, that are recorded on a BD-ROM serving as a read-only type Blu-ray Disc when the BD-ROM standard is extended for a recordable recording medium. In the following description, the management structure in the BD-ROM is referred to as a BDMV format. In addition, a format extended for a recording medium capable of recording a BDMV format is referred to as an extended BDMV format for the sake of convenience.

For example, a bit stream encoded in an encoding scheme such as an MPEG (Moving Pictures Experts Group) video scheme or an MPEG audio scheme and multiplexed in accordance with an MPEG2 system is referred to as a clip AV stream (or AV stream). The clip AV stream is recorded as a file in a disc by means of a file system defined in "Blu-ray Disc Read Only Format part 2" that is one of the standards relevant to Blu-ray Disc. This file is referred to as a clip AV stream file (or AV stream file).

The clip AV stream file is a management unit on the file system, and is not always a management unit that is easily understandable to a user. Considering the user convenience, there is a need for a mechanism for collectively reproducing video contents divided into a plurality of clip AV stream files, a mechanism for reproducing only a part of the clip AV stream file, and further, and information for smoothly carrying out specific reproducing or initial reproducing is needed to be recorded on a disc as a database. The database is specified in "Blu-ray Disc Read Only Format part 3" that is one of the standards relevant to Blu-ray Disc.

Figure 1:
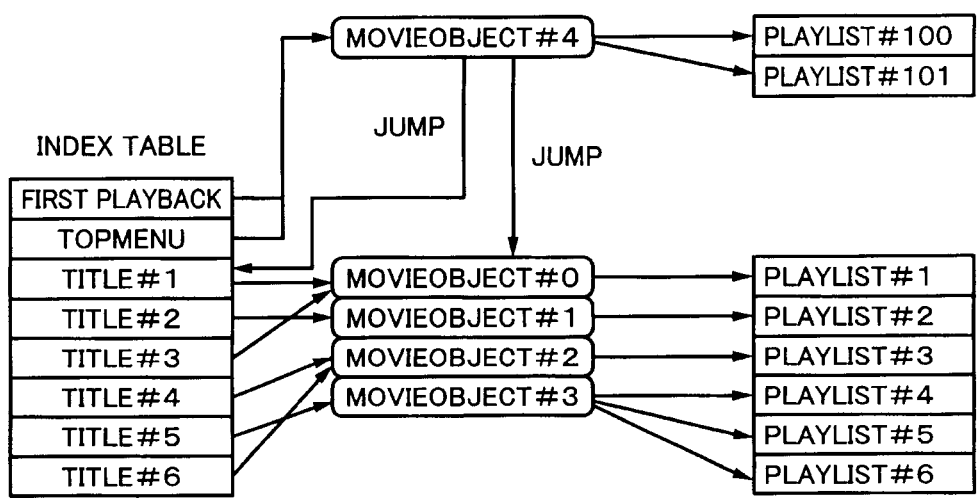
FIG. 1 is a schematic diagram schematically depicting an exemplary relationship among titles, MovieObjects, and PlayLists in accordance with the BD-ROM standard.
Figure 2A:
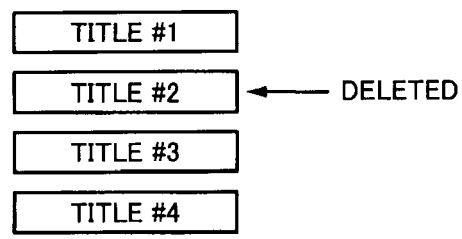
FIGS. 2A to 2C are schematic diagrams for explaining a method for managing a title relevant to title editing.
Figure 2B:
Figure 2C:
Figure 3:
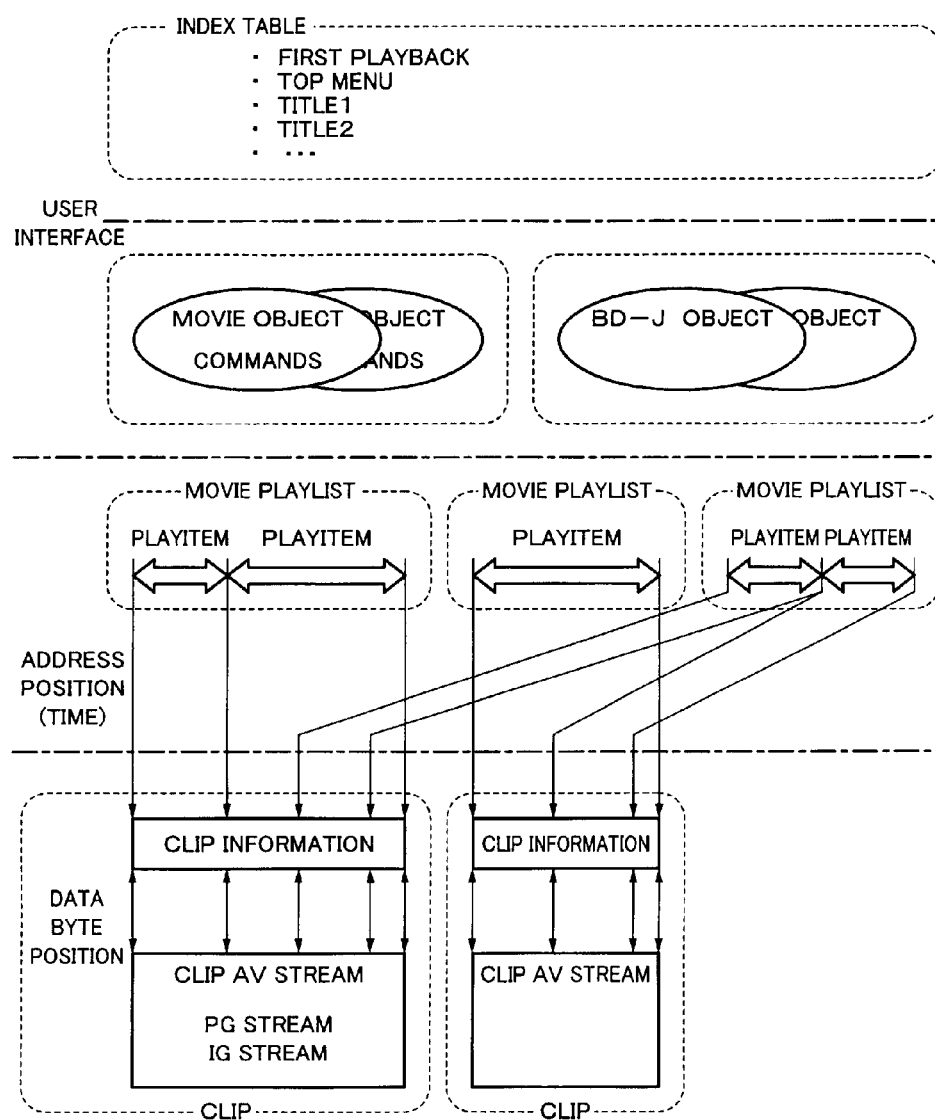
FIG. 3 is a schematic diagram schematically depicting a data model of a BD-ROM.

FIG. 3 schematically depicts a data model of a BD-ROM. A data structure of the BD-ROM is made of 4 layers, as shown in FIG. 3. The lowest layer is provided as a layer in which a clip AV stream is allocated (referred to as clip layer for the sake of convenience). A right above layer is provided as a layer in which Movie PlayList and PlayItem are allocated, for specifying a reproducing section relevant to the clip AV stream (referred to as PlayList layer for the sake of convenience). The still above layer is provided as a layer in which a Movie Object (MovieObject) or the like is allocated, the MovieObject being composed of a command for specifying a reproducing sequence in response to the Movie PlayList (referred to as object layer for the sake of convenience). The top layer is provided as a layer in which an index table is allocated for managing titles or the like stored in the BD-ROM (referred to as index layer for the sake of convenience).

The above clip layer will be described here. The clip AV stream is provided as a bit stream in which video data and audio data are multiplexed in a format such as MPEG2 TS (Transport Stream). Information relevant to this clip AV stream is recorded as clip information in a file.

In addition, multiplexed in the clip AV stream are a presentation graphics (PG) stream that serves as a graphics stream for displaying a subtitle and an interactive graphics (IG) stream obtained by streaming data used for menu display or the like (such as button image data).

A clip AV stream file and a clip information file having the corresponding clip information recorded thereon are regarded as one object, and referred to as clip. Namely, the clip is one object composed of the clip AV stream and clip information.

A file is generally handled as a byte sequence. The contents of the clip AV stream file are expanded along a time axis, and an entry point in the clip is typically specified on a time base. When a time stamp of an access point for a predetermined point has been assigned, the clip information file can be used to find address information on which data readout should be started in the clip AV stream file.

The PlayList layer will be described here. A movie PlayList is composed of a specification of an AV stream file to be reproduced and a set of reproducing start points (IN points) and reproducing end points (OUT points) for specifying a reproducing section of the specified AV stream file. A group of information of a reproducing start point and a reproducing end point is referred to as PlayItem. The movie PlayList is composed of a set of PlayItems. Reproducing a PlayItem means reproducing part of an AV stream file referenced to the PlayItem. In other words, a corresponding section in a clip is reproduced on the basis of information on IN points and OUT points contained in the PlayItem.

The object layer will be described here. A MovieObject includes an HDMV navigation command program and terminal information linked with the MovieObject. The HDMV navigation program is a command for controlling reproducing of a PlayList. Hereinafter, the HDMV navigation command is abbreviated as a navigation command for the sake of convenience. The terminal information includes information for allowing a user's BD-ROM player to operate interactively. The user operation such as a menu screen call and a title search is controlled on the basis of the terminal information.

A BD-J object is made of objects made with a Java (registered trademark) program. Since the BD-J object is not relevant to the present invention so much, a detail is not described here.

The index layer will be described here. The index layer is composed of index tables. The index table is a table of a top level that defines titles of a BD-ROM disc. Based on the title information stored in the index table, reproducing of the BD-ROM disc is controlled by a module manager a system software reside in a BD-ROM.

Figure 4:
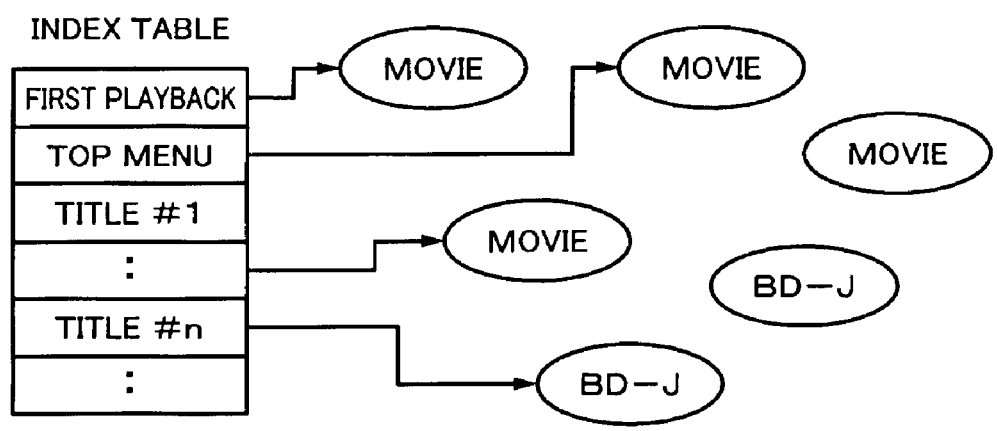
FIG. 4 is a schematic diagram for explaining an index table.

That is, as schematically shown in FIG. 4, an arbitrary entry in the index table is referred to as a title. All of FirstPlayback, TopMenu, and Titles#1, #2, . . . entered in the index table are handled as titles. Each title indicates a link relevant to a MovieObject or a BD-J object. Each title shows either HDMV title or BD-J title.

For example, if the content stored in the BD-ROM is a movie, FirstPlayback is a picture (trailer) for advertisement of a movie production company to be imaged prior to reproducing the main movie. For example if the content is a movie, the TopMenu is a menu screen for selecting reproducing the movie, a chapter search, setting a subtitle or language, or a privileged video reproducing. In addition, a title is provided as each picture selected from the TopMenu. A configuration can be also provided such that a title further serves as a menu screen.

Figure 5:
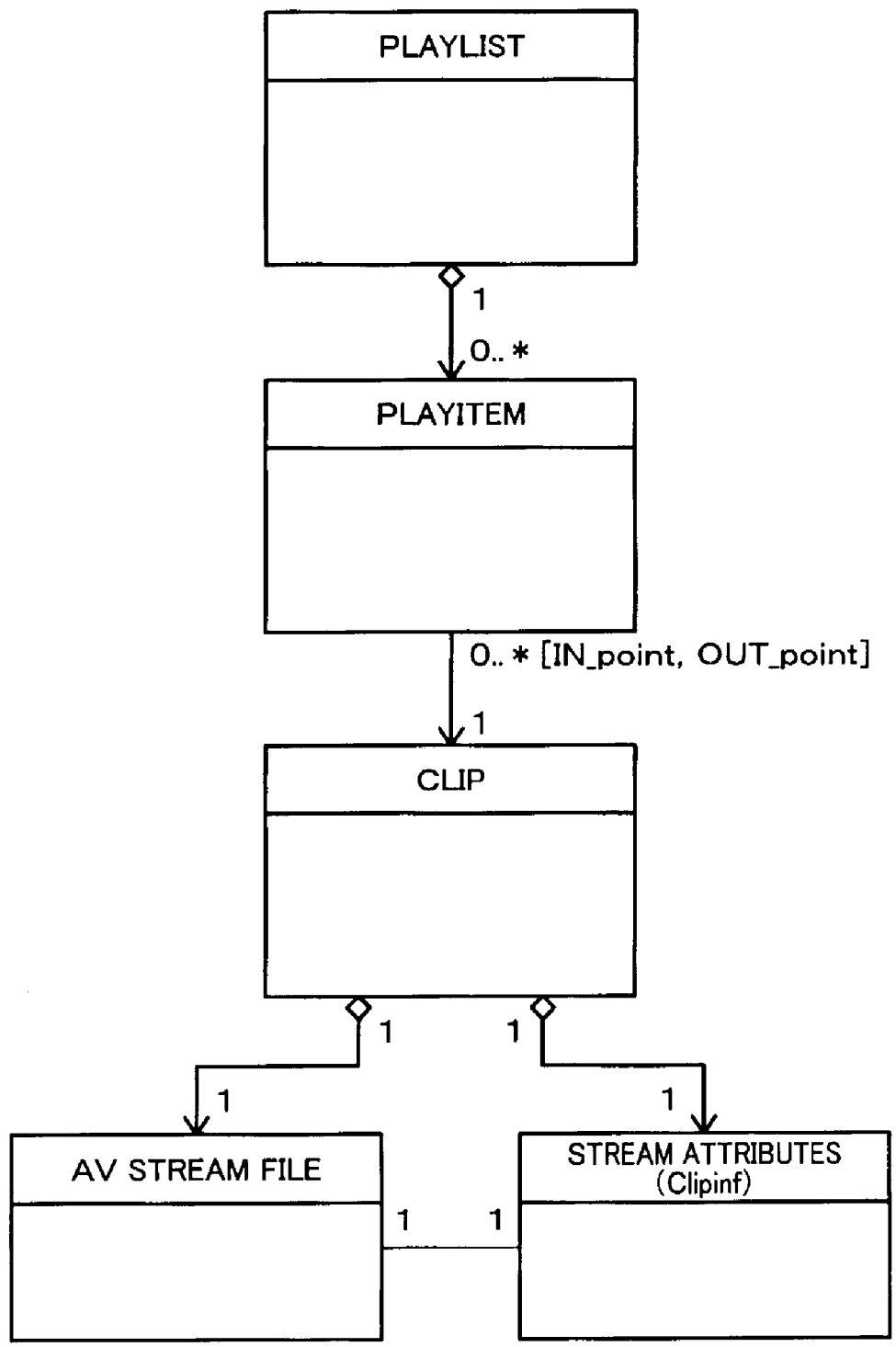
FIG. 5 is a UML diagram showing a relationship among clip AV streams, clip information, clips, PlayItems, and PlayLists.

FIG. 5 is a UML (unified modeling language) chart showing a relationship among the clip AV streams, clip information (Stream Attributes), clips, PlayItems, and PlayLists. The PlayList is associated with one or more of PlayItems, and the PlayItem is associated with one clip. A plurality of PlayItems that are different from each other in start point and/or end point can be associated with one clip. One clip AV stream file is referenced from one clip. Similarly, one clip information file is referenced from one clip. A clip AV stream file and a clip information file have a one to one correlation. Definition of such a structure makes it possible to specify a non-destructive reproducing sequence so as to reproduce only an arbitrary portion without changing a clip AV stream file.

Figure 6:
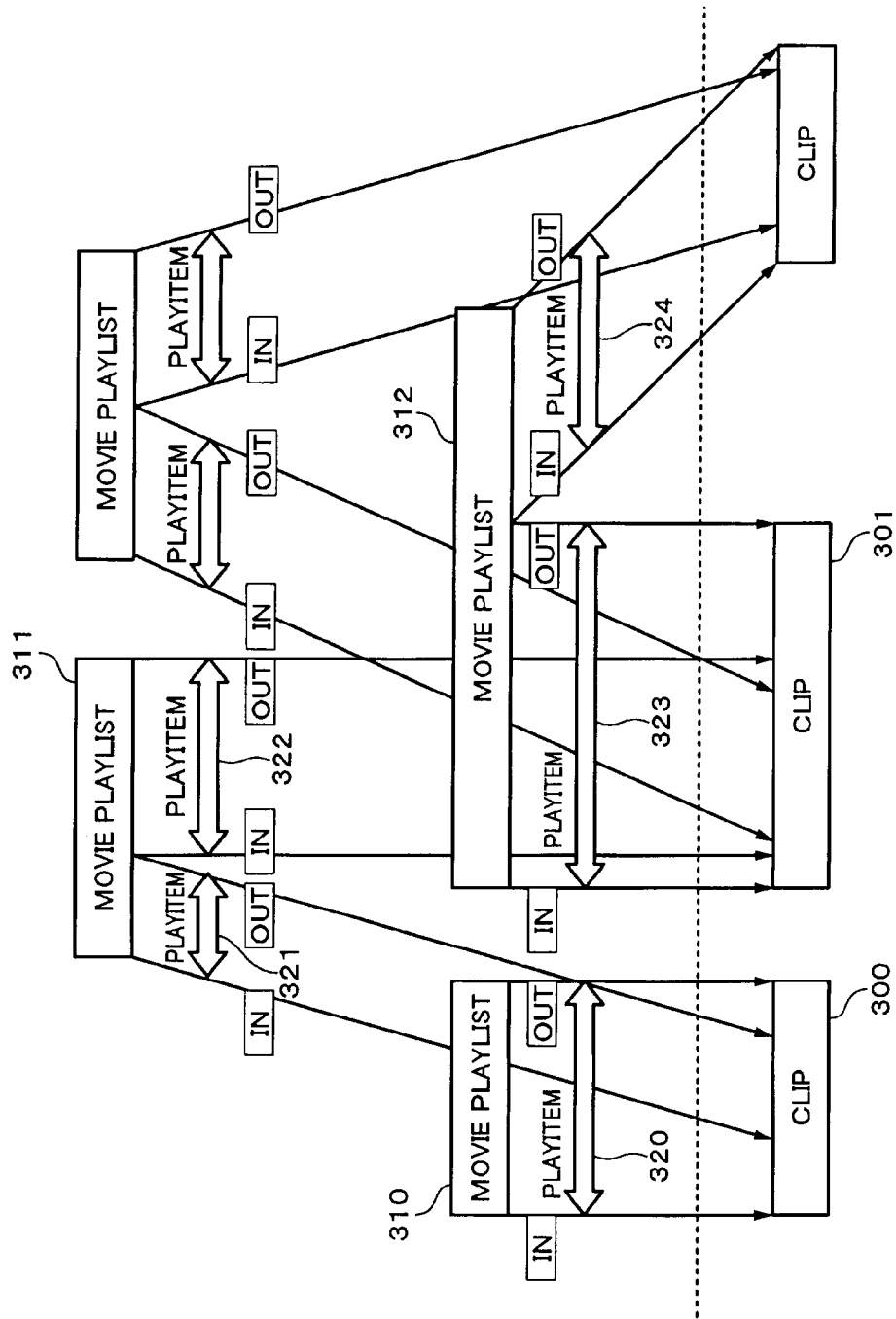
FIG. 6 is a schematic diagram for explaining a method for referencing identical clip from a plurality of PlayLists.

As shown in FIG. 6, identical clips can be referenced from a plurality of PlayLists. In addition, a plurality of clips can be specified from one PlayList. A clip is referenced in accordance with an IN point and an OUT point indicated in a PlayItem in a PlayList. In the example of FIG. 6, a Clip 300 is referenced from PlayItem 320 of PlayList 310 and a section indicated by an IN point and an OUT point is referenced from PlayItem 321 from among PlayItems 321 and 322 that configure PlayList 311. In Clip 301, a section indicated by an IN point and an OUT point is referenced from PlayItem 322 of PlayList 311 and a section indicated by an IN point and an OUT point of PlayItem 323 is referenced among PlayItems 323 and 324 of PlayList 312.

Figure 7:
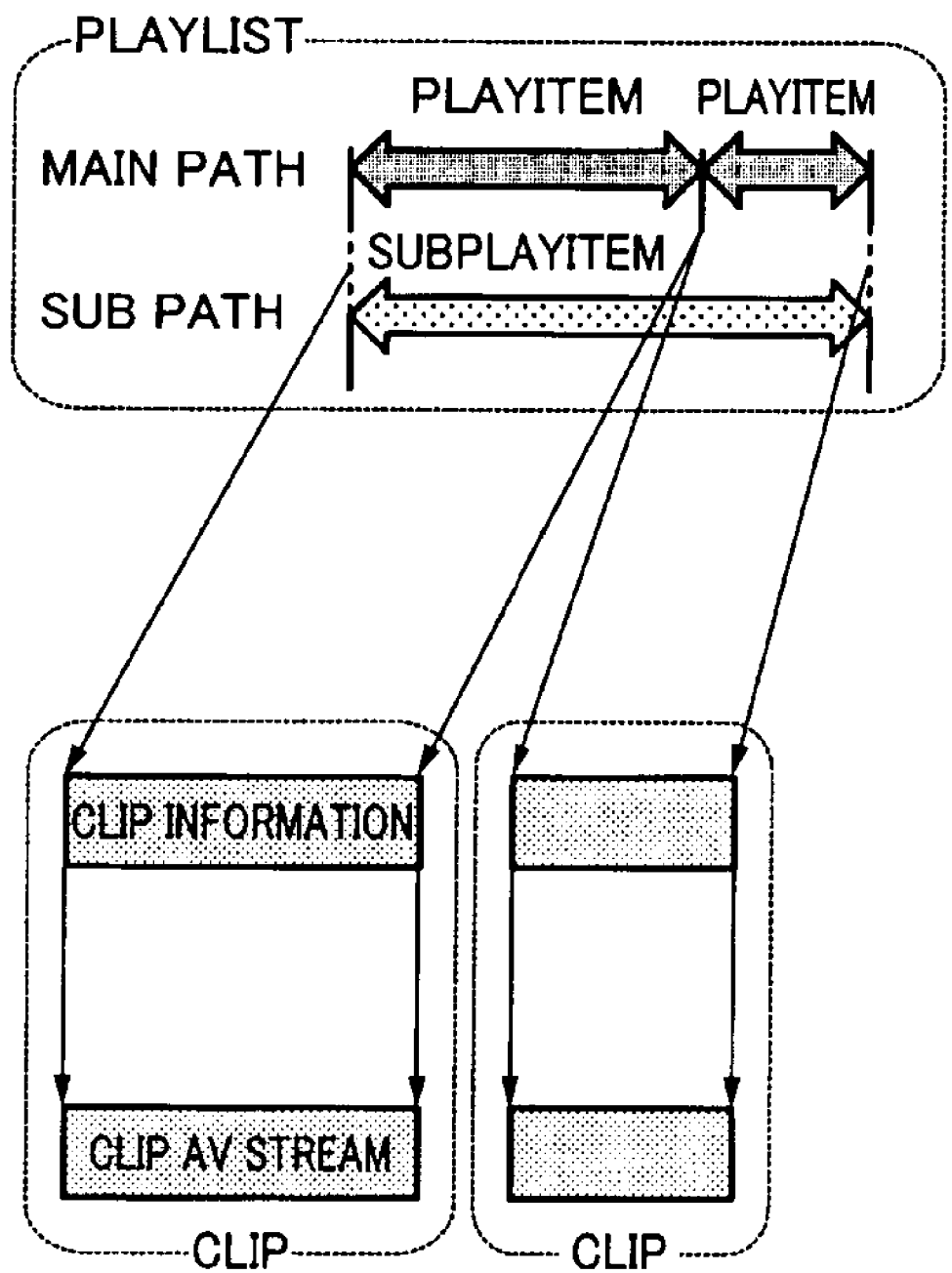
FIG. 7 is a schematic diagram for explaining a sub-path.

A PlayList, as shown as an example in FIG. 7, can have a sub-path that corresponds to a sub-PlayItem associated with a main path that corresponds to a PlayItem to be mainly reproduced. For example, a PlayItem for post-recording associated with this PlayList can be provided as a sub-PlayItem in the PlayList. Although a detail is not described, the PlayList can have a sub-PlayItem only when a predetermined condition is met.

Figure 8:
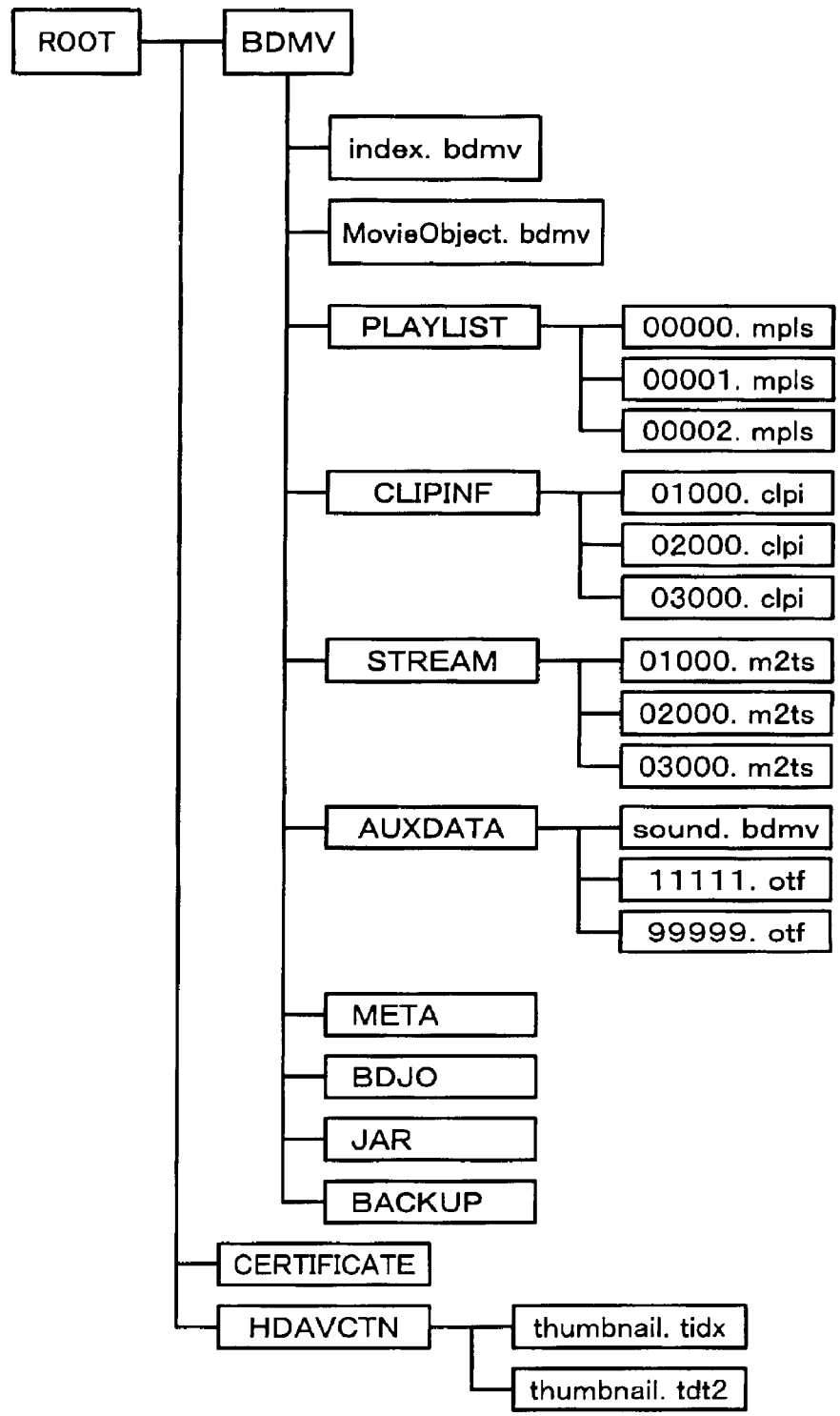
FIG. 8 is a schematic diagram for explaining a structure for managing a file recorded on a recording medium.

Referring now to FIG. 8, a description will be given to a structure of managing a file recorded on a BD-ROM, specified in "Blu-ray Disc Read Only Format part 3". Files are hierarchically managed in accordance with a directory structure. One directory (root directory in the example of FIG. 8) is first created on a recording medium. A hierarchy under this directory is managed by one recording/reproducing system.

A directory "BDMV", a directory "CERTIFICATE", and a directory "HDAVCTN" are placed under the root directory. Information on copyrights is stored in the directory "CEATIFICATE". Thumbnail files such as reduced size of typical images of clips are placed in the directory "HDAVCTN". A data structure described referring to FIG. 3 is stored in the directory "BDMV".

Only two files "index.bdmv" and "MovieObject.bdmv" can be placed immediately under the directory "BDMV". In addition, directory "PLAYLIST", directory "CLIPINF", directory "STREAM", directory "AUXDATA", directory "META", directory "BDJO", directory "JAR", and directory "BACKUP" are placed under the directory "BDMV".

The file "index.bdmv" is described with respect to the contents of the directory BDMV. More specifically, this file "index.bdmv" corresponds to an index table in the index layer that is the top layer as described above. One or more items of MovieObject information are stored in the file "MovieObject.bdmv". Namely, this file "MovieObject.bdmv" corresponds to the object layer described above.

The directory "PLAYLIST" is a directory in which a PlayList database is to be placed. That is, the directory "PLAYLIST" includes a file "xxxxx.mpls" that is a file concerning a movie PlayList. The file "xxxxx.mpls" is a file that is created for a respective one of the movie PlayLists. In the filename, "xxxxx" immediately preceding "." (period) is for entry of five-digit numbers, and "mpls" immediately succeeding the period is an extent fixedly specified for a file of this type.

The directory "CLIPINF" is provided as a directory in which a clip database is to be placed. That is, the directory "CLIPINF" includes a file "zzzzz.clpi" that is a clip information file relevant to a respective one of clip AV stream files. In the file name, "zzzzz" immediately preceding "." (period) is for entry of five-digit numbers, and "clip" immediately succeeding the period is an extent fixedly specified for a file of this type.

The directory "STREAM" is provided as a directory in which an AV stream file serving as an entity is to be placed. That is, the directory "STREAM" includes a clip AV stream file that corresponds to a respective one of clip information files. Each clip AV stream file is composed of transport streams of MPEG2 (Moving Pictures Experts Group 2) (hereinafter, abbreviated as MPEG2 TS), and a file name is defined as "zzzzz.m2ts". In the file name, "zzzzz" immediately preceding the period is made identical to the corresponding clip information file, thus making it possible to easily grasp a correlation between the clip information file and this clip AV stream file.

The directory "AUXDATA" is provided as a directory in which files such as a sound file, a font file, a font index file, and a bit map file for use in menu display or the like are to be placed. The file "sound.bdmv" stores sound data associated with applications of HDMV interactive graphics streams. A file name is fixedly specified as "sound.bdmv". A file "aaaaa.otf" stores font data for use in functions such as subtitle display and the BD-J applications as described above. In the file name, "aaaaa" immediately preceding the period is for entry of five-digit numbers, and "oft" immediately succeeding the period is an extent fixedly specified for a file of this type. A file "bdmv.fontindex" is a font index file.

A meta data file is stored in the directory "META". Files related to the BD-J object described above are stored in the directory "BDJO" and the directory "JAR". Further, backups of each of the directories and files described above are stored in the directory "BACKUP". Since these directories "META", "BDJO", "JAR", and "BACKUP" do not relate to the gist of the present invention, a detail thereof is not described here.

The directory "HDAVCTN" can place two types of thumbnail files "thumbnail.tidx" and "thumbnail.tdt2". The thumbnail file "thumbnail.tidx" stores information for managing thumbnail images stored in the thumbnail file "thumbnail.tdt2".

Among the files shown in FIG. 8, those deeply relevant to the present invention will be described in more details. First, a file "index.bdmv" placed immediately under the directory "BDMV" will be described. FIG. 9 shows a syntax representing an exemplary structure of the file "index.bdmv". The figure shows a syntax based on a description technique of C-language used as a descriptive language of a program of a computer or the like. Other figures showing a syntax are described similarly.

In FIG. 9, a field "type_indicator" has a 32-bit data length and indicates that this file is an index table. A field "version_number" has a 32-bit data length and indicates a version of this file "index.bdmv". A field "Indexes_start_address" has a 32-bit data length and indicates a start address of a block "Indexes( )" that exists in this syntax.

A field "ExtensionData_start_address" has a 32-bit data length and indicates a start address of a block "ExtensionData( )" that exists in this syntax. The field "ExtensionData_start_address" indicates a start address of a block "ExtensionData( )" in relative number of bytes from a first byte of this file "index.bdmv". The relative number of bytes is started from "0". If a value of this field "ExtensionData_start_address" is set to "0", it indicates that the block "ExtensionData( )" does not exists in this file "index.bdmv".

An area, of which a data length is 192 bytes, following the field "ExtensionData_start_address", is a reserved area for the future use. A block "AppInfoBDMV( )" is provided as a block that a content producer can describe arbitrary information, and does not influence operations such as a player's operation.

The block "Indexes( )" is substantial contents of this file "index.bdmv", and for example, FirstPlayback to be reproduced when a disc is mounted on a player or a title called from the TopMenu (MovieObject or BD-J object) are specified in accordance with the contents described in this file "index.bdmv". In the following description, a MovieObject and a BD-J object are collectively described as MovieObjects or the like. A movie PlayList file described later is read on the basis of a command described in a MovieObject or the like called from the index table.

FIG. 10 shows a syntax representing an exemplary structure of the block "Indexes( )". In FIG. 10, a portion that does not directly relate to the present invention is described as an area Reserved. In other words, the expression of FIG. 10 is limitative to a description applied to an extended BDMV format for a recordable recording medium. A field "length" has a 32-bit data length and indicates a data length from immediately succeeding this field "length" to the end of this block "Indexes( )". Subsequently, a block "FirstPlayback( )" and a block "TopMenu( )" are allocated.

Information on an object used in FirstPlayback is described in the block "FirstPlayback( )". A fixed value "01" is described in a first field of the block "FirstPlayback( )", indicating that the object used in FirstPlayback is a MovieObject. Then, a reproducing type of an HDAVC title is indicated in a field "HDAVC_Title_playback_type" that has a 2-bit data length, and ID of the MovieObject used in FirstPlayback is indicated in a field "FirstPlayback_mobj_id_ref" that has a 16-bit data length.

ID of the MovieObject is indicated by a value "mobj_id" used as a loop variable in a "for" loop statement of the MovieObject on the basis of a syntax of the MovieObject described later with reference to FIGS. 11 and 12, for example. In this example, the value "mobj_id" corresponding to a MovieObject to be referenced is stored in the field "FirstPlayback_mobj_id_ref".

The field "FirstPlayback_mobj_id_ref" in the block "FirstPlayback( )" of the block "Indexes( )" may specify a MovieObject of a TopMenu or may specify a title.

Information on an object used in the TopMenu is described in the block "TopMenu( )". A fixed value "01" is described in a first field of the block "TopMenu( )", and a fixed value "01" is further described sandwiching an area "Reserved" that has a 30-bit data length with the "01" of the first field. A field "TopMenu_mobj_id_ref" has a 16-bit data length and indicates ID of the MovieObject used in the TopMenu.

A next field "number_of_Titles" of the block "TopMenu( )" has a 16-bit data length and indicates the number of titles that can be selected and reproduced by a user. In accordance with a following "for" loop statement, a block "Title[title_id]( )" is described with a value "title_id" is defined as an argument by the number of times indicated in this field "number_of_Titles". Information for each title titles is described in the block "Title[title_id]( )". The value "title_id" is a numeric values ranging from "0" to a value indicated in the field "number_of_Titles" for identifying a title.

In the block "Title [title_id]( )", a fixed value "01" is described in a first field, and a field "Title_mobj_id_ref" is described sandwiching an area "Reserved" that has a 46-bit data length with the "01" of the first field. The field "Title_mobj_id_ref" has a 16-bit data length and indicates ID of the MovieObject used in this title.

FIG. 11 shows a syntax representing an exemplary structure of a file "MovieObject.bdmv" placed immediately under the directory "BDMV". A field "type_indicator" has a 32-bit (4-byte) data length and indicates that this file is a file "MovieObject.bdmv". In the field "type_indicator", a character string made of four characters encoded in accordance with an encoding scheme specified in ISO (International Organization for Standardization) 646 is described. In the example of FIG. 11, a character string "MOBJ" made of four characters encoded in accordance with an existing scheme in ISO646 is described in the field "type_indicator", indicating that this file is a file "MovieObject.bdmv".

A field "version_number" has a 32-bit (4-byte) data length and indicates a version number of this file "MovieObject.bdmv". In this file "MovieObject.bdmv", the field "version_number" needs to a character string "0100" made of four characters encoded in accordance with the encoding scheme specified in ISO646.

A field "ExtensionData_start_address" has a 32-bit data length and indicates a start address of a block "ExtensionData( )" that exists in this syntax. The field "ExtensionData_start_address" indicates a start address of a block "ExtensionData( )" by a relative number of bytes from a first byte of this file "MovieObject.bdmv". The relative number of bytes is started from "0". If a value of this field "ExtensionData_start_address" is set to "0", it indicates that the block "ExtensionData( )" does not exist in this file "MovieObject.bdmv".

A field "padding_word" in this syntax shown in FIG. 11 has a 16-bit data length, and is included in a "for" loop statement by the number of times indicated by a value N1 or a value N2 in accordance with the syntax of this file "MovieObject.bdmv". The value N1 or the value N2 is 0 or an arbitrary positive integer. In addition, an arbitrary value can be used in the field "padding_word".

An area, of which a data length is 224 bit, following the field "ExtensionData_start_address", is a reserved area for the future use. A block "MovieObject( )" serving as a main body of this file "MovieObject.bdmv" is stored in an area next to the reserved area.

FIG. 12 shows a syntax representing an exemplary structure of a block "MovieObject( )". A field "length" has a 32-bit data length and indicates a data length from immediately succeeding this field "length to the end of this block "MovieObject( )". A field "number_of_mobjs" is allocated sandwiching a reserved area that has a 32-bit data length with the field "length". The field "number_of_mobjs" indicates the number of MovieObjects stored in accordance with immediately succeeding "for" loop statement. A MovieObject is uniquely specified by a value "mobj_id" used as a loop variable of the "for" loop statement. The value "mobj_id" is a value starting from 0, and a MovieObject is defined in accordance with a sequential order described in the "for" loop statement.

In a block "TerminalInfo( )" that exists in the "for" loop statement, a fixed value "1", a fixed value "0", and a fixed value "0" each are stored in accordance with a field that has a 1-bit data length, and a field "number_of_navigation_commands[mobj_id]" is allocated sandwiching a reserved area of which a data length is 13 bits with the 1-bit field. This field "number_of_navigation_commands[mobj_id]" represents the number of navigation commands ("navigation_command") included in a MovieObject "MovieObject[mobj_id]( )" specified by a value "mobj_id".

In accordance with the "for" loop statement in which a value "command_id" is defined as a loop variable, a navigation command is described by the number indicated in the field "number_of_navigation_commands[mobj_id]". In other words, a field "navigation_command[mobj_id][command_id] allocated in this "for" loop statement stores a navigation command "navigation_command" of which a sequential order is indicated by a value "command_id", the command being included in a block "MovieObject[mobj_id]( )" indicated by a value "mobj_id". The value "command_id" is defined by a value starting from 0, and the navigation command "navigation_command" is defined in a sequential order described in this "for" loop statement.

Now, a description will be given here with respect to a block "ExtensionData( )" defined when the BD-ROM standard is extended to be applicable to a recordable recording medium. The block "ExtensionData( )" can be described in files such as a file "index.bdmv" in which an index table is to be stored, a file "xxxxx.mpls" in which a PlayList is to be stored, and a clip information file "zzzzz.cpli". In one embodiment of the present invention, the block "ExtensionData( )" of the file "index.bdmv" is used.

FIG. 13 shows an syntax representing an exemplary structure of the block "ExtensionData( )". A field "length" has a 32-bit data length and indicates, by the number of bytes, a data length from immediately succeeding this field "length to the end of the block "ExtensionData( )". If the data length indicated in this field "length" is not set to "0", a description of an "if" statement and subsequent is executed.

A field "data_block_start_address" has a 32-bit data length and indicates a start address of a block "data_block( )" of which a main body of extension data "ext_data" in this syntax is to be stored, by a relative number of bytes from a first byte of this block "ExtensionData( )". Namely, the relative number of bytes starts from "0". The field "data_block_start_address" should meet a condition for 32-bit alignment shown below.

$$data\_block\_start\_address \% 4=0$$

A field "number_of_ext_data_entries" has 8-bit data length and indicates the number of entries of extension data to be stored in a block "data_block( )" of this block "ExtensionData( )". Information for retrieving the main body of extension data is stored in entries of extension data. More specifically, the entry of extension data is a block "ext_data_entry( )" composed of, for example, a field ID1, a field ID2, a field "ext_data_start_address", and a field "ext_data_length". In the block "ExtensionData( )", the blocks "ext_data_entry( )" of the number, corresponding to the numbers indicated in this field "number_of_ext_data_entries", exist.

The field ID1 has a 16-bit data length and represents that extension data described in this block "ExtensionData( )" is extension data for a recording apparatus. A value of this field ID1 is a first value for identifying extension data. This value can be defined that it is assignable by a licenser (authorized person) of a standard that includes this "ExtensionData( )". The field ID2 is a second value for identifying extension data. This value can be defined as representing a version number of the extension data. In this block "ExtensionData", there should not exist two or more blocks "ext_data_entry( )" having identical value in the field ID1 or the field ID2 are equal to each other.

A field "ext_data_start_address" has a 32-bit data length and indicates a start address of extension data "ext_data" that corresponds to extension data entries (block "ext_data_entry( )") in which this field "ext_data_start_address" is included. The field "ext_data_start_address" indicates a start address of extension data "ext_data" by a relative number of bytes from a first byte of the block "ExtensionData( )". The field "ext_data_start_address" should meet a condition for 32-bit alignment shown below.

$$ext\_data\_start\_address \% 4=0$$

A field "ext_data_length" has a 32-bit data and indicates a data length of extension data "ext_data" that corresponds to extension data entries (block "ext_data_entries( )") in which this field "ext_data_start_address" is included. The data length is indicated by the number of bytes.

When the number of extension data entries (block "ext_data_entry( )) are described by the number indicated in the field "number_of_ext_data_entries", fields "padding_word", each of which has a 16-bit data length and is made of an arbitrary data sequence, are repeated by an arbitrary number of times L1 while two fields are grouped. Then, the block "data_block( )" is described in which a main body of extension data is to be stored. One or more items of extension data is/are stored in the block "data_block( )". Each item of extension data "ext_data" is retrieved from the block "data_block( )" on the basis of the field "ext_data_length" of the field "ext_data_start_address" described above.

Figure 14:
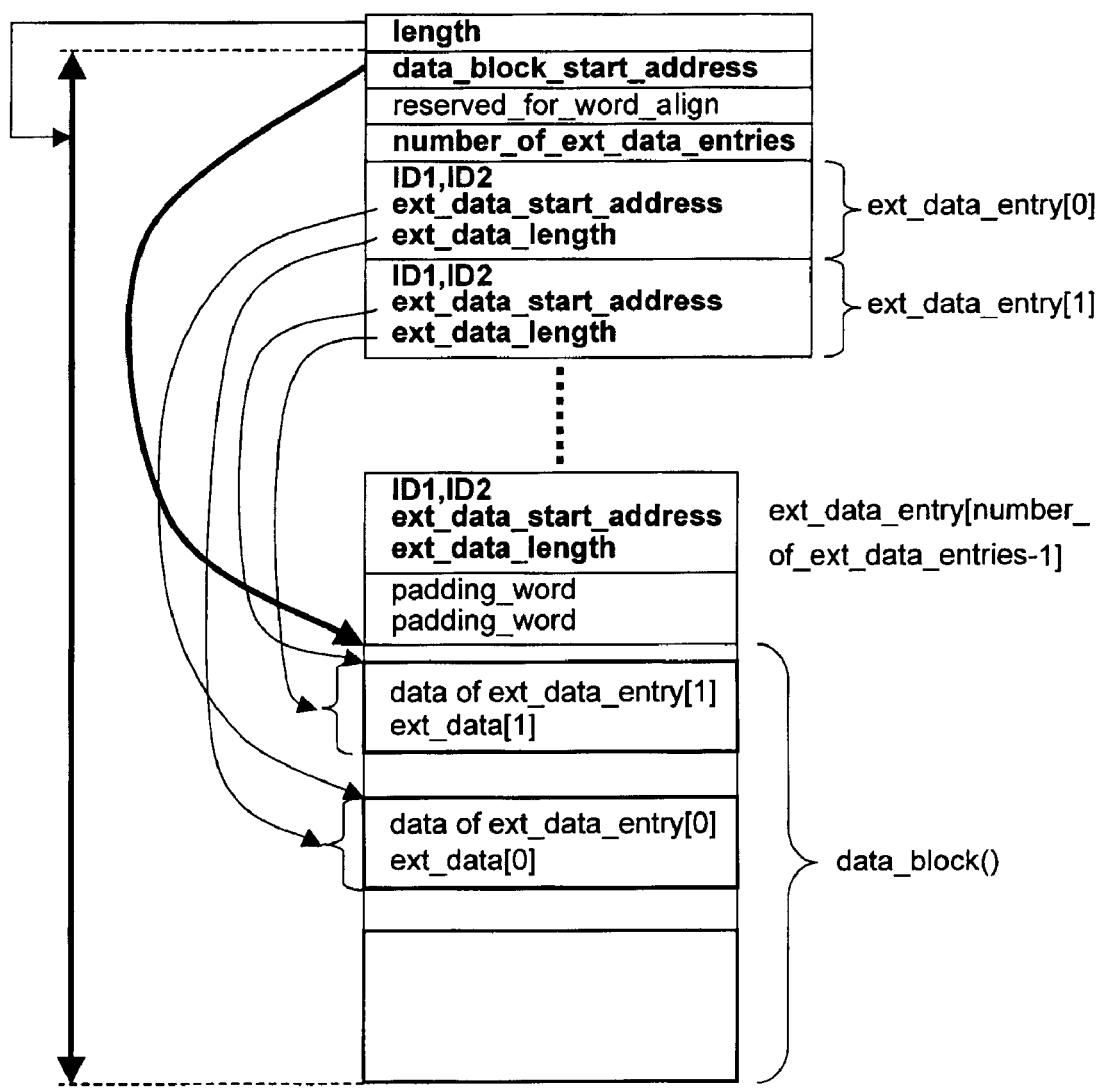
FIG. 14 is a schematic diagram schematically depicting a reference relationship among each of data in a block ExtensionData( )

FIG. 14 schematically depicts a reference relationship among items of data in a block "ExtensionData( )" A data length from a position immediately succeeding a field "length" to the end of the block "ExtensionData( )" is indicated in the field "length". A start position of a block "data_block( )" is indicated in a field "data_block_start_address". The number of blocks "ext_data_entry" equivalent to the number indicated in a field "number_of_ext_data_entries" are described. A field "padding_word" of an arbitrary length is placed between a last block "ext_data_entry" and the block "data_block( )".

Extension data "ext_data" indicated with the block "ext_data_entry( )" is placed in the block "data_block( )". A position and a data length of each item of extension data "ext_data" are indicated in a field "ext_data_start_address" and a field "ext_data_length" in the corresponding block "ext_data_entry( )". Therefore, the sequential order of the extension data "ext_data" in the block "data_block( )" may not coincide with that of the corresponding block "ext_data_entry( )".

In this manner, a two-layered structure is provided by the block "data_block( )" in which a main body of extension data is to be stored, and the block "ext_data_entry( )" in which information on access to the extension data contained in the block "data_block( )" is to be stored, thereby making it possible to store plural items of extension data.

Figure 15:
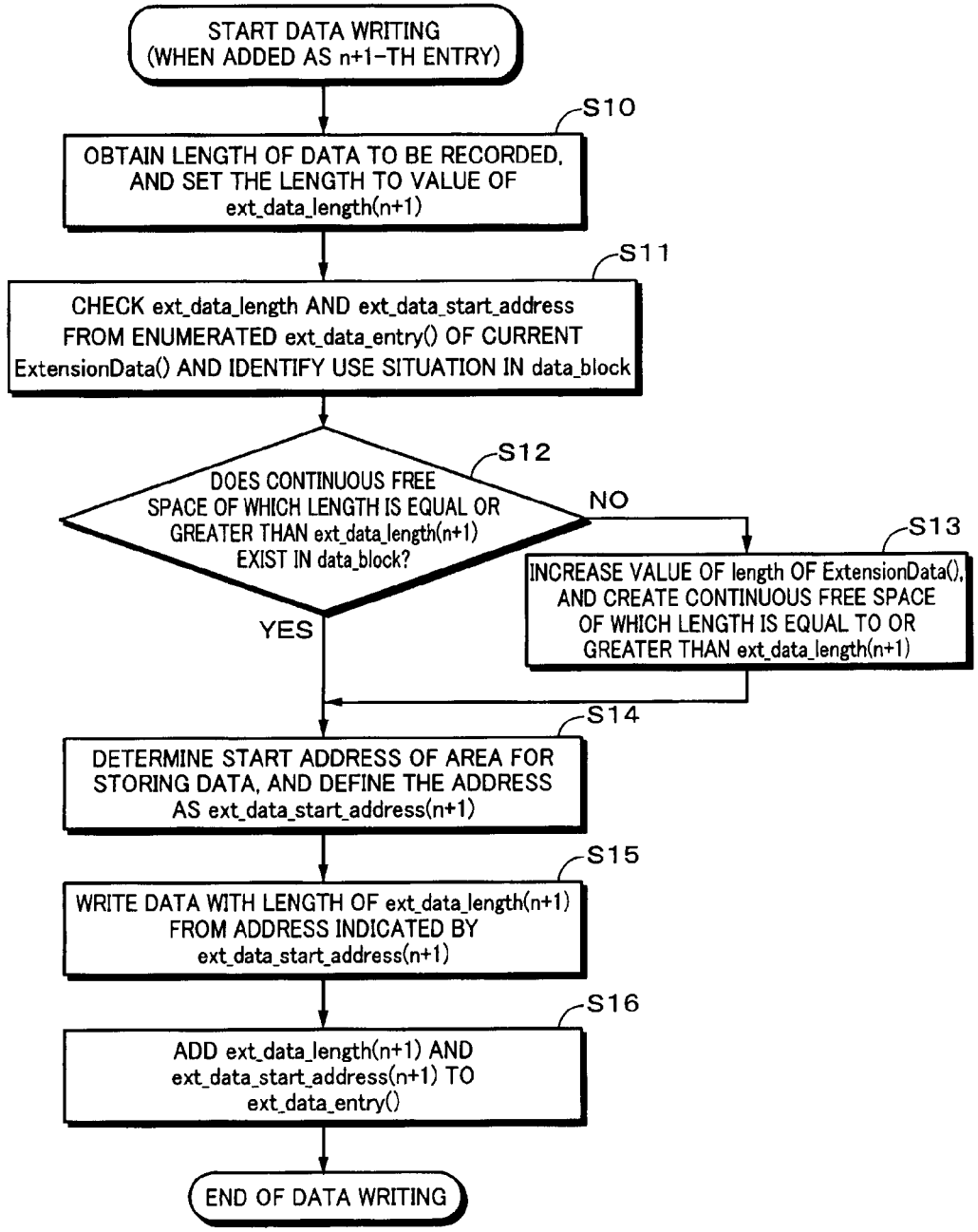
FIG. 15 is a flow chart showing an exemplary process for writing data in a block ExtensionData( )

Now, a description will be given regarding to methods for creating and reading out extension data according to one embodiment of the present invention. FIG. 15 is a flow chart showing an exemplary process for writing data in a block "ExtensionData( )". FIG. 15 also shows an example in the case of adding extension data as an (n+1)-th entry in the block "ExtensionData( )" and rewriting the block "ExtensionData( )".

First, in step S10, a data length of extension data to be written is obtained, and the obtained data length is set as a value of a field "ext_data_length[n+1]". A description of "[n+1]" corresponds to a number of the (n+1)-th entry. Next, in step S11, values of a field "ext_data_length" and a field "ext_data_start_address" in a block "ext_data_entry( )" enumerated in a current block "ExtensionData( )" are checked to retrieve a use situation of the block "data_block( )".

In the next step S12, it is determined whether or not there exists a continuous free space of which a data length is equal to or greater than that indicated in the field "ext_data_length

[n+1]" that is a data length of extension data to be written, in the block "data_block( )". If the determining result is affirmative, processing is moved to step S14.

On the other hand, if it is determined that there is no continuous free space of which a data length is equal to or greater than that indicated in the field "ext_data_length[n+1]", processing is moved to step S13 in which a value of a field "length" in the block "ExtensionData( )" is increased, and then, a continuous free space, of a data length, which is equal to or greater than that indicated in the field "ext_data_length[n+1]", is created in the block "data_block( )". When the free space is created, processing is moved to step S14.

In step S14, a start address of an area, in which extension data to be written, is determined, and a value of the start address is defined as a field "ext_data_start_address[n+1]". In the next step S15, extension data "ext_data[n+1]", having the length set in the field "ext_data_length[n+1]" in the above step S10, is written starting from the address set in the field "ext_data_start_address[n+1]".

When data writing finishes, the field "ext_data_length[n+1]" and the field "ext_data_start_address[n+1]" are added to the block "ext_data_entry( )" in step S16.

In the foregoing description, it is assumed that the block "ExtensionData( )" to be rewritten has already been read out from a recording medium such as a disc and stored in a memory of a recording apparatus. Therefore, the extension of the block "ExtensionData( )" due to a change of the value of the field "length" in step S13 is entrusted to a system, and is performed by the system properly carrying out memory allocation.

Figure 16:
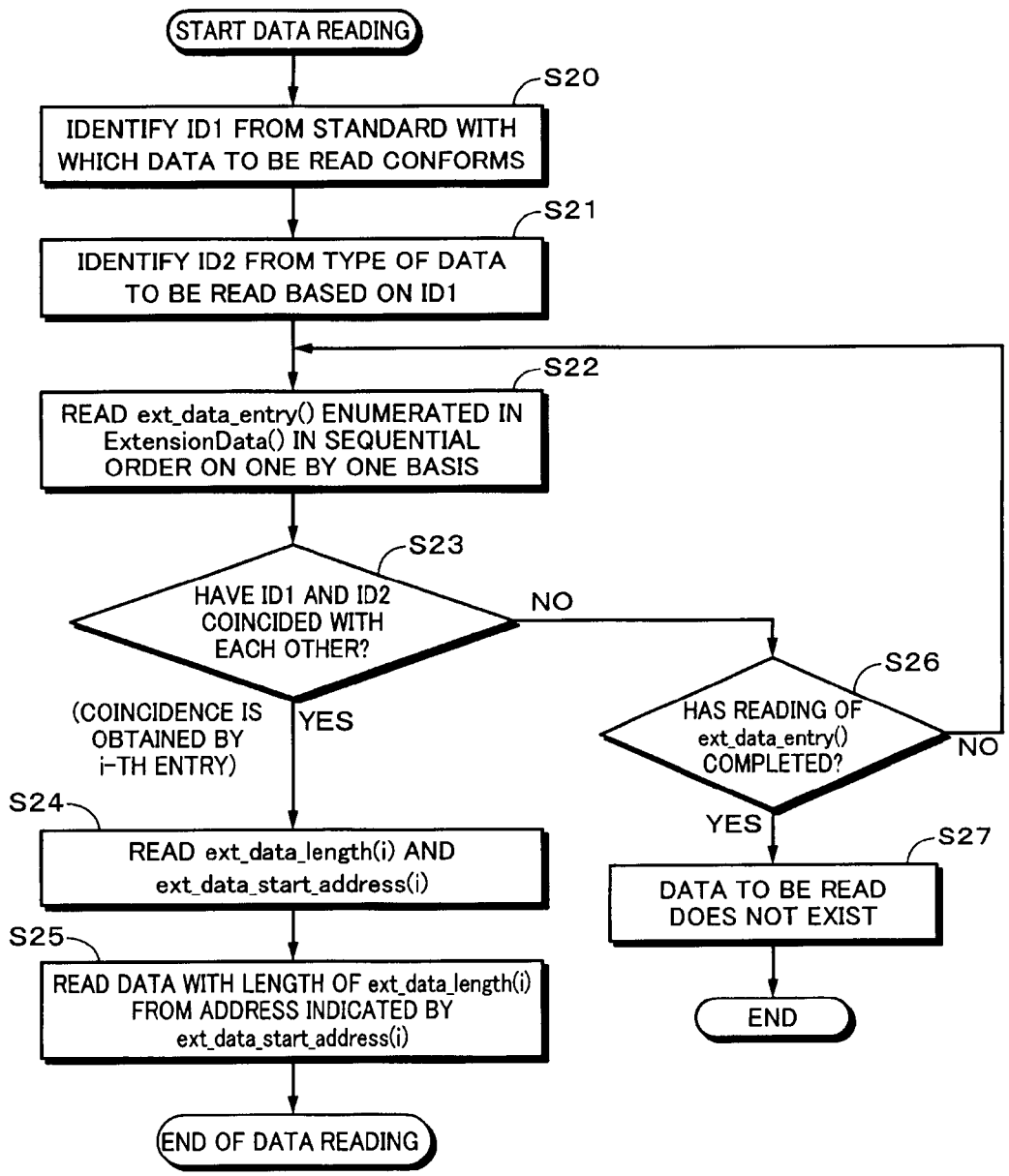
FIG. 16 is a flow chart showing an exemplary process for reading out extension data from a block ExtensionData( )

FIG. 16 is a flow chart showing an exemplary process for reading out extension data from a block "ExtensionData( )". The process according to the flowchart of FIG. 16 can be applied to both of a read-only recording medium (for example, BD-ROM) and a recordable recording medium (for example, BD-RE).

First, in the first step S20, a value of a field ID1 is retrieved from a standard with which extension data to be read conforms. In step S21, a value of a field ID2 is retrieved from a type of extension data to be read.

In the next step S22, blocks "ext_data_entry( )" enumerated in the block "ExtensionData( )" are sequentially read on one by one basis. Then, in step S23, it is determined whether or not values of field ID1 and field ID2 included in the read block "ext_data_entry( )" coincide with those of the field ID1 and the field ID2 retrieved in the steps S20 and 21 described above.

If the determining result is negative, processing is moved to step S26 in which it is determined whether or not all the blocks "ext_data_entry( )" enumerated in the block "ExtensionData( )" have been read. If the determining result is affirmative, processing is moved to step S27 in which it is determined that extension data to be read does not exist in this block "ExtensionData( )" to finish a series of processes. If the determining result is negative, processing returns to step S22 in which a next block "ext_data_entry( )" is read.

If in the above step S23, it is determined that the values of the field ID1 and the field ID2 included in the block "ext_data_entry( )" coincide with the retrieved values of the field ID1 and the field ID2, processing is moved to step S24. In this step, it is determined that the values have coincided with an [i]-th entry in the block "ExtensionData( )".

In step S24, a value of a field "ext_data_length[i]" and a value of a field "ext_data_start_address[i]", are read from a block "ext_data_entry( )" of an [i]-th entry. Then, in step S25, data is read out by a data length indicated in the field "ext_data_length[i]" starting from an address indicated in the field "ext_data_start_address[i]" read in step S24.

Now, one embodiment of the present invention will be described here. In the invention, information indicating a title to which a PlayList first belongs is added to the PlayList, and the information is made unchanged regardless of title editing or the like. By defining such information, compatibility of a menu configuration can be maintained between a system for maintaining a title number regardless of title editing and a system for, at the time of title editing, maintaining a sequential order of recording titles as well as changing title indices in response to the editing.

The information indicating a title to which the PlayList first belongs is defined as PlayList attribute information in extension data embedded in a file "index.bdmv", and is described in a block "TableOfPlayLists( )" in a field "ExtensionData( )" of the file "index.bdmv". FIG. 17 shows a syntax representing an exemplary structure of a block '7data_block( )" (refer to FIG. 13) in the field ExtensionData( )" in the file "index.bdmv", for describing the PlayList attribute. In this example of FIG. 17, the block "data_block( )" is described as a block "IndexExtensionData( )".

First, referring to FIG. 13 described above, a field ID1 is set to a value "0x1000" and a field ID2 is set to a value "0x0100" in the block "ExtensionData( )". The values described in these fields ID1 and ID2 are identified is while reference is made to a table stored in advance in a read-only memory (ROM) etc. at, for example, the reproducing apparatus side. The block "IndexExtensionData( )" is stored in an area indicated by each of a field "ext_data_start_address" and a field "ext_data_length" contained in the block "data_block( )". In description of a numeric value, "0x" indicates that the numeric value is expressed in a hexadecimal notation.

In the block "IndexExtensionData( )", a character string made of four characters encoded in accordance with an encoding scheme specified in ISO646, the character string indicating a type of data that follows, is described in a field "type_indicator". In this example of FIG. 17, a character string "IDEX" made of four characters encoded in accordance with the existing scheme specified in ISO646 is described in the field "type_indicator", indicating that a type of data that follows is "IndexExtensionData".

Following the field "type_indicator", a reserved area having a 32-bit data length is allocated, and then, a field "TableOfPlayLists_start_address" having a 32-bit data length is allocated next to the reserved area. In the field "TableOfPlayLists_start_address", a start address of the block "TableOfPlayLists( )" is indicated while the beginning of the block "IndexExtensionData( )" is defined as a reference.

Following the field "TableOfPlayLists_start_address", a field "MakersPrivateData_start_address" having a 32-bit data length is arranged, in which a start address of the block "MakersPrivateData( )" is indicated while the beginning of the block "IndexExtensionData( )" is defined as a reference. A block "UIAppInfoHDAVC( )" is allocated via a reserved area having a 192-bit data length. Next, the block "TableOfPlayLists( )" described above is allocated via a padding word "padding_word" having a 16-bit data length. Further, the block "MakersPrivateData( )" is allocated via the padding word "padding_word" having a 16-bit data length.

Since the blocks "UIAppInfoHDAVC( )" and "MakersPrivateData( )" are not relevant to the present invention so much, they are not described here.

FIG. 18 shows a syntax representing an exemplary structure of the block "TableOfPlayLists( )" described above. A field "length" has a 32-bit data length and indicates, in the number of bytes, a data length from immediately succeeding the field "length" to the last byte of the block "TableOfPlayLists( )". A field "number_of_PlayLists" has a 16-bit data length and indicates the number of PlayLists. In other words, a total number of PlayLists that exist on a disc is indicated by the field "number_of_PlayLists".

In accordance with a next "for" loop statement, the number of fields "PlayList_file_name", fields "PlayList_attribute", and fields "title_id_ref" equivalent to the number indicated by the field "number_of_PlayLists" are described, respectively. In other words, one loop indicated by the "for" loop statement corresponds to one PlayList, and then, PlayList information composed of a file name of the PlayList, an attribute assigned to the PlayList, and reference title ID of the PlayList is described.

The sequential orders based on the "for" loop statement are defined as orders of recording. In other words, if one PlayList is added, a value of the field "number_of_PlayLists" is incremented by 1, and information on the added PlayList is additionally described at the back of information on the existing PlayList.

Fields "reserved_for_future_use" having 6-bit and 16-bit data lengths, respectively, in a loop defined by the "for" loop statement are reserved areas for the future use.

In a field "PlayList_file_name", a file name of a PlayList is encoded in accordance with an encoding scheme specified in ISO646 and described. A field "PlayList_attribute" indicates an attribute assigned to the PlayList. The PlayList is classified, based on the factor, into a first type corresponding to a PlayList generated with clip generation, a second type corresponding to a PlayList created by using part or all of existing titles or PlayLists, and a third type used for reproducing a menu. To each PlayList, an attribute "Real" (first type), an attribute "Virtual" (second type), and an attribute "Menu" (third type) are assigned depending on types of PlayLists.

In the following description, for the sake of convenience, a PlayList having the attribute "Real" assigned thereto is referred to as a real PlayList, a PlayList having the attribute "Virtual" assigned thereto is referred to as a virtual PlayList, and a PlayList having the attribute "Menu" assigned thereto is referred to as a menu PlayList.

ID (number) of a title to which a PlayList indicated in a field "PlayList_file_name" in an identical loop belongs is described in a field "title_id_ref". As a more specific example, a corresponding value "title_id 8 in a block "Indexes( )" contained in an index file "index.bdmv" is described. In the case where the PlayList is not reproduced as a title, but reproduced from only a FirstPlayback, a value of the field "title_id_ref" is set to a first fixed value, for example, "0xFFFF". Or, in the case where the PlayList is not played as a title, but reproduced from a TopMenu, a value of the field "title_id_ref" is set to a second fixed value, for example, "0xFFFE".

Now, a description will be given with respect to exemplary process for editing a menu according to one embodiment of the present invention. In the embodiment of the present invention, the following restrictions are provided to the BD-ROM standard, thereby achieving menu editing in the case where the BD-ROM standard is extended to a recordable recording medium.

With respect to a relationship among titles, MovieObjects and PlayLists, restrictions are provided as follows. The term "title" used here denotes a title to be selected and reproduced in a TopMenu.

(A) A PlayList for a TopMenu and a PlayList for reproducing a general title should be independent of each other.

(B) Each title should be a movie title. In other words, each title should not be an interactive title.

(C) Each title should be composed of one PlayList via one MovieObject.

With respect to sequential orders of titles and PlayLists, restrictions are provided as follows.

(D) The sequential order of PlayLists contained in a block "TableOfPlayLists( )" should be in the sequential order of recording.

(E) A PlayList reproduced from each title should be determined to be arranged so that arrangement of titles contained in a block "Indexes( )" in a file "index.bdmv" corresponds to arrangement contained in a block "TableOfPlayLists( )", of the remaining PlayLists other than a PlayList that configures a FirstPlayback and a TopMenu.

The above-described restrictions (A) "A PlayList for a TopMenu and a PlayList for reproducing a general title should be independent of each other."; (B) "Each title should be a movie title. In other words, each title should not be an interactive title."; and (C) "Each title should be composed of one PlayList via one MovieObject" are provided as restrictions for facilitating a menu editing process.

In other words, according to these restrictions (A), (B) and (C), a PlayList for reproducing a menu and a PlayList for reproducing a title called from the menu are clearly separated from each other, and a reference relationship among PlayLists, MovieObjects and titles is provided as a one-to-one relationship. For example, each title references one MovieObject, and each MovieObject calls one PlayList. As one example, a navigation command described in a MovieObject is provided as a command for specifying and reproducing one PlayList file.

A method for editing a menu based on these restrictions (A), (B) and (C) is provided as follows, for example. By way of example, let us consider a case in which a clip is additionally recorded on a disc in which a plurality of titles have already been recorded and a title for reproducing the recorded clip is added to a menu. First, a PlayList corresponding to a newly recorded clip is generated. An attribute "Real" is added to the generated PlayList, and the PlayList is defined as a real PlayList. Then, a MovieObject for calling this real PlayList is generated. A link relevant to this MovieObject is described in an index table to form a title.

Next, the existing menu is deleted. More specifically, a PlayList (menu PlayList) and a MovieObject for reproducing a menu are deleted, and a TopMenu and a FirstPlayback are deleted from an index table. The MovieObject and PlayList for reproducing a menu can be easily deleted since the PlayList for reproducing a general title is clearly separated from the menu PlayList that is a type of the PlayList for reproducing a menu.

Further, based on the existing title and an added title, a PlayList and a MovieObject for reproducing a menu are newly created and a TopMenu and a FirstPlayback are described in an index table. A reference relationship among PlayLists, MovieObjects and titles is provided as a one-to-one relationship. Thus, the MovieObject and the PlayList for reproducing the menu can be easily newly created based on the existing title and the added title.

In this manner, a menu update along with title addition can be performed very easily under the restrictions (A), (B) and (C).

The above-described restrictions (D) "The sequential order of PlayLists contained in a block "Table( )PlayLists( )" should be in the sequential order of recording." and (E) "A PlayList reproduced from each title should be determined to be arranged so that arrangement of titles contained in a block "Indexes( )" in a file "index.bdmv" corresponds to arrangement contained in a block "TableOfPlayLists( )", of the remaining PlayLists other than a PlayList that configures a FirstPlayback and a TopMenu." are provided as restrictions for maintaining compatibility between a system for maintaining a title number regardless of title editing and a system for, at the time of title editing, maintaining a sequential order of recording titles as well as changing the title indices in response to the editing.

In general, in the case where titles are recorded on a recordable recording medium, it is considered that title indices are assigned in the sequential order of recording. Therefore, in accordance with the restriction (D) described above, a restriction is provided that all the PlayLists referenced from MovieObjects are arranged in the sequential order of recording in a block "TableOfPlayLists( )". In this manner, the sequential order of recording titles can be restored by checking the sequential order of PlayLists described in the block "TableOfPlayLists( )".

As one example, depending on a specification of a recording machine, a TopMenu or a block "Indexes( )" in an index table may be deleted along with title editing or the like. Even in such a case, the sequential order of recording titles can be restored by referencing the block "TableOfPlayLists( )" according to the restriction (D).

In accordance with only the restriction (D), however, the sequential order of recording titles is maintained, whereas title indices are not maintained. Depending on a specification of a recording machine, an unchanged number is desired to be provided to a user by maintaining title indices assigned at the time of title recording, even if title editing is performed. The restriction (E) described above is provided to solve a problem associated with compatibility of title management between the recording machines. In the restriction (E), title number information is provided to the PlayList side instead of the title side, so that even if, for example, a block "Indexes( )" in an index table is deleted, title number information provided at the time of title recording is not lost.

In other words, a PlayList to be reproduced is determined while a value of a field "title_id" contained in a block "Indexes( )" is made to correspond to a value of a field "title_id_ref" contained in a block "TableOfPlayLists( )". For example, configuring of a menu screen and reproduction of a PlayList are performed based on the field "title_id_ref" in the case of a recording machine using a title number assigned at the time of recording, and are performed based on the field "title_id" in the case of a recording machine maintaining the sequential order of recording titles.

Figure 19:
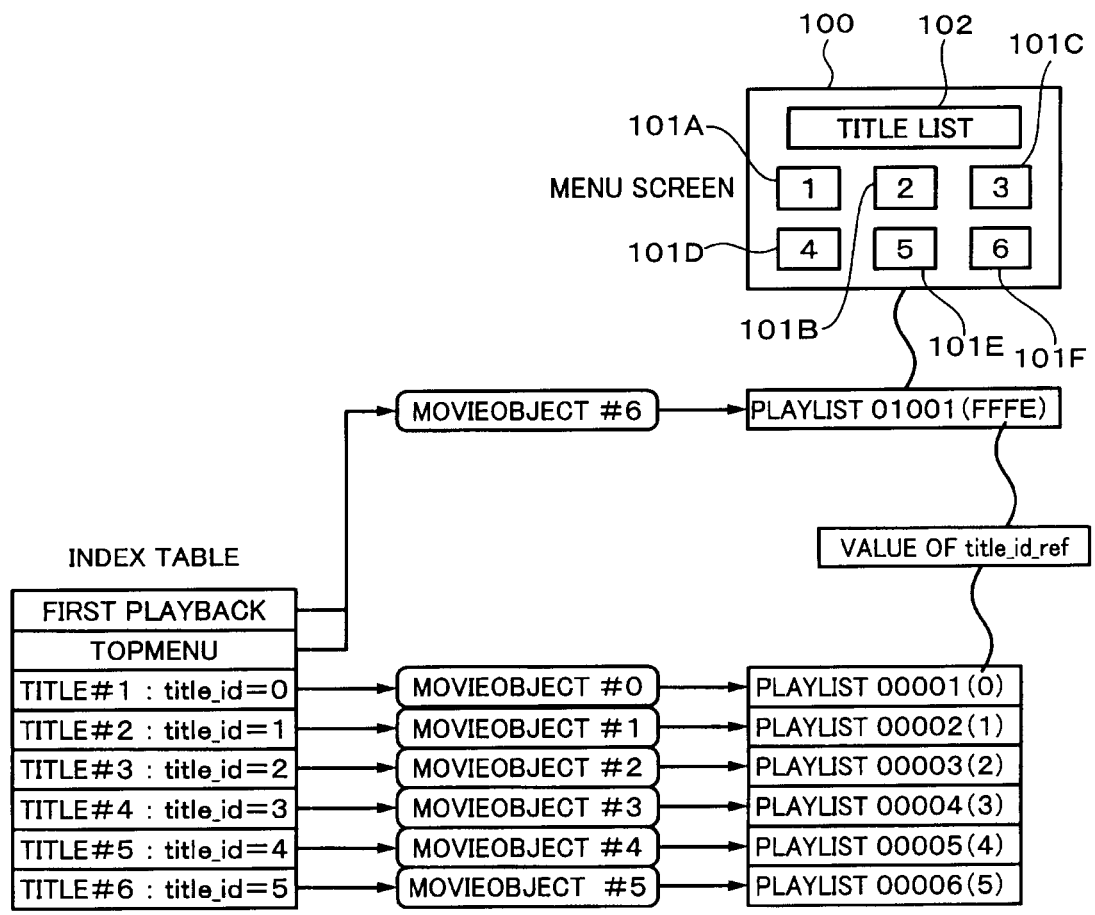
FIG. 19 is a schematic diagram depicting exemplary configurations of a menu screen that exists before editing, and of titles, MovieObjects and PlayLists relating to the menu screen.
Figure 20:
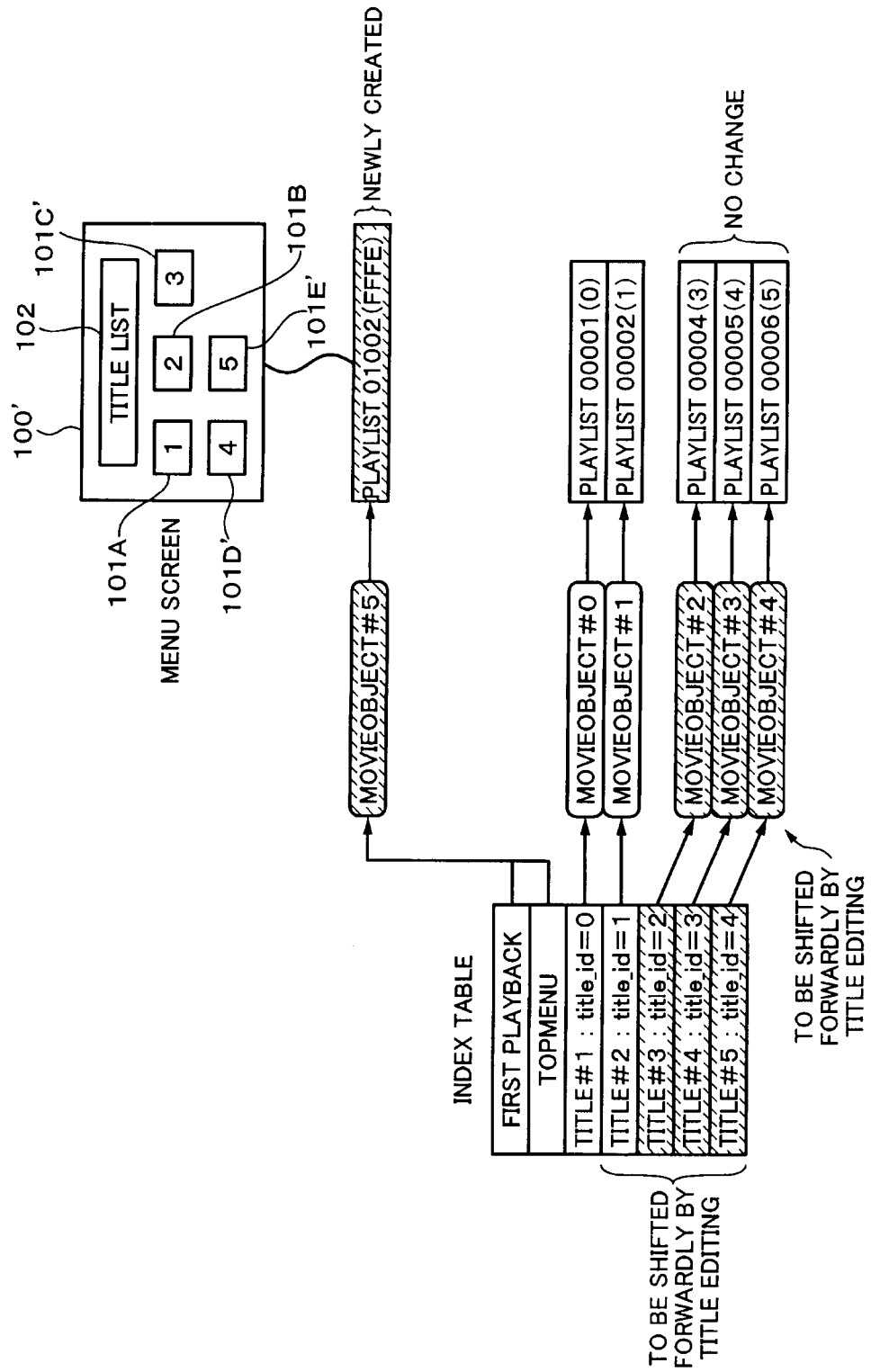
FIG. 20 is a schematic diagram depicting exemplary configurations of a menu screen in the case where a title #3 has been deleted, and of titles, MovieObjects and PlayLists relating to the menu screen.
Figure 21:
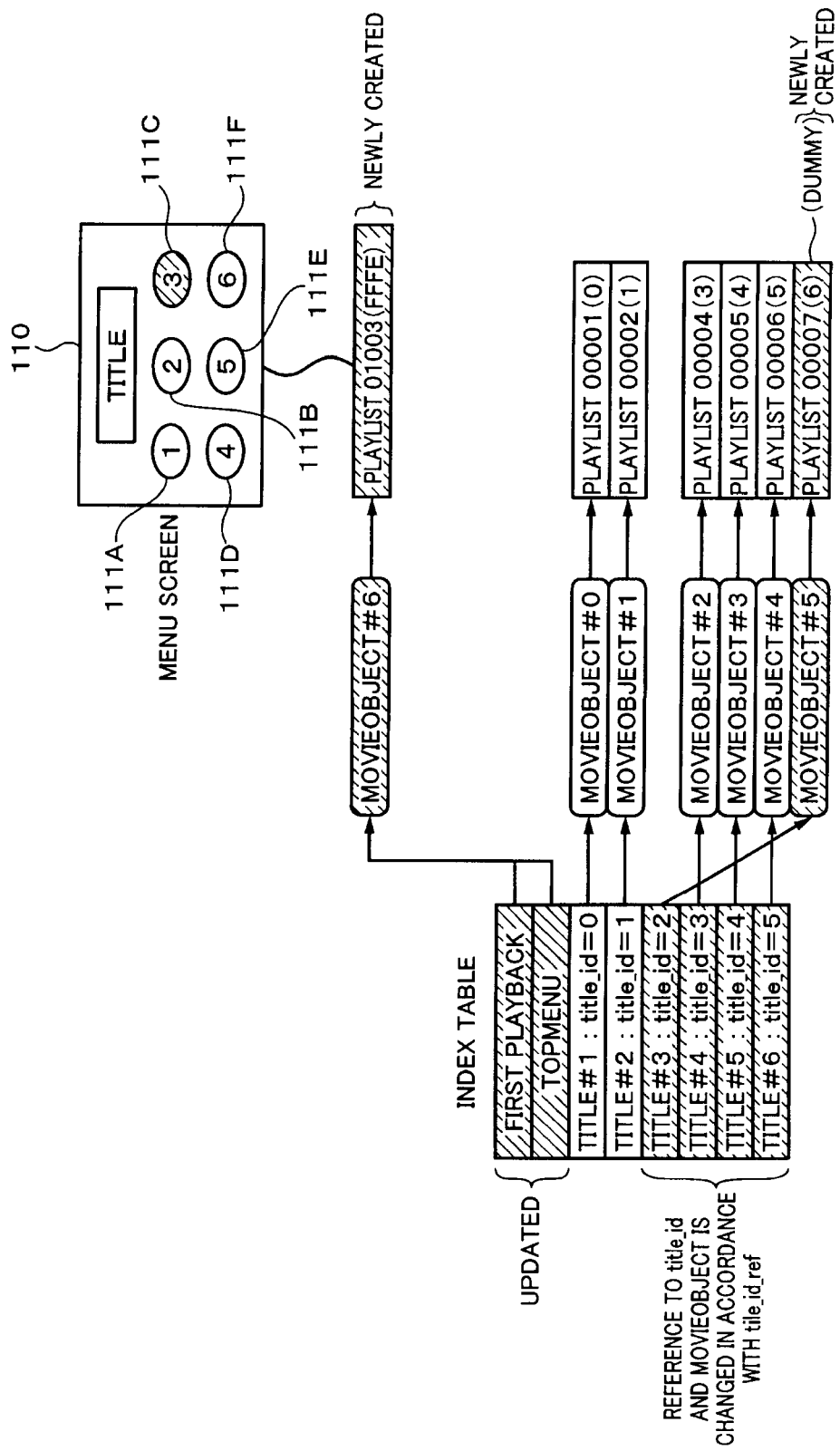
FIG. 21 is a schematic diagram depicting exemplary configurations of a menu screen with a title number restored, and of titles, MovieObjects and PlayLists relating to the menu screen.

Referring now to FIGS. 19 to 21, a process for editing a menu according to one embodiment of the present invention will be described more specifically. FIG. 19 shows exemplary configurations of a menu screen 100 existing before editing, and of titles, MovieObjects and PlayLists relating to the menu screen 100. It is assumed that six titles #1 to #6 have already been recorded on a disc in the example of FIG. 19. Each title is registered as a field "Title[title_id]" identified by a value "title_id" used as a loop variable in a block "Indexes( )" in a file "index.bdmv", as has already been described with respect to FIG. 10, and a MovieObject is referenced by a field "Title_mobj_id_ref[title_id]". It is assumed that a title number is defined as a value obtained by adding 1 to a value "title_id". MovieObjects are stored in the sequential order of values "title_id" in a file "MovieObject.bdmv", and information on PlayLists to be reproduced is described.

PlayLists are stored under a directory "PLAYLIST" while file names are assigned like "00001.mpls", "00002.mpls", "00003.mpls", "00004.mpls", "00005.mpls", and "00006.mpls" in the sequential order of generated PlayLists, for example.

Each title calls one MovieObject in accordance with the restriction that the item (B) "each title should be a movie title". In addition, each MovieObject references one PlayList in accordance with the restriction that the item (C) "each title should be composed of one PlayList via one MovieObject". In other words, titles, MovieObjects, and PlayLists have a one-to-one relationship with one another.

In the example of FIG. 19, a title with a value "title_id" of 1 and a title number #2 references only a MovieObject #1 to which the value "title_id" corresponds, and the MovieObject #1 references only a PlayList of a file name "00002.mpls". In this example, the PlayList of the file name "00002.mpls" is a virtual PlayList having an attribute "Virtual" assigned thereto. A title of a title number #3 references only a MovieObject #2 to which the value "title_id" corresponds. In this example, the MovieObject #2 references only a PlayList of a file name "00003.mpls". The PlayList of the filename "00003.mpls" is a real PlayList having an attribute "Real" assigned thereto, and has a one-to-one correlation with respect to a clip.

A menu screen for instructing reproduction of a title recorded on a disc is reproduced on the basis of a FirstPlayback and a TopMenu in an index table. MovieObjects referenced to reproduce the menu screen are described in a field "FirstPlayback_mobj_id_ref" of a block "FirstPlayback( )" contained in a block "Indexes( )" in a file "index.bdmv" and a field "TopMenu_mobj_id_ref" of a block "TopMenu( )". In this example of FIG. 19, these fields "FirstPlayback_mobj_id_ref" and "TopMenu_mobj_id_ref" both are configured to reference an identical MovieObject #6.

The MovieObject #6 references a menu PlayList for actually reproducing a menu screen. In the example of FIG. 19, the MovieObject #6 references a PlayList having a file name "01001.mpls", which has an attribute "Menu" assigned thereto.

A MovieObject for assigning the attribute "Menu" to the PlayList for reproducing the menu screen, the MovieObject being referenced from the FirstPlayback and the TopMenu, is configured to reference only a menu PlayList having the attribute "Menu" assigned thereto. In addition, a MovieObject referenced from the FirstPlayback and the TopMenu is configured to disable reference of each title called from the TopMenu or reference of a MovieObject referenced from the each title. Specifying in this way makes it is possible to achieve the restriction that the item (A) "A PlayList for a TopMenu and a PlayList for reproducing a general title should be independent of each other".

Further, a clip referenced from a menu PlayList and a clip referenced from a PlayList that corresponds to each title called from a TopMenu, are independent of each other.

In a state before this editing, values of a field "title_id_ref" contained in a block "TableOfPlayLists( )" are set to 0, 1, 2, 3, 4 and 5, respectively, with respect to the PlayLists with the file names "0000.mpls", "00002.mpls", "00003.mpls", "00004.mpls", "00005.mpls" and "00006.mpls", respectively. In addition, in the PlayList with the file name "01001.mpls" referenced from the FirstPlayback and the TopMenu via the MovieObject #6, a value of the field "title_id_ref" is set to "0xFFFE", indicating that this PlayList is reproduced from the TopMenu.

In the following description, in order to avoid complication, "a value of a field "title_id_ref" contained in a block "TableOfPlayLists( )" is conveniently abbreviated as "a value "title_id_ref".

In FIG. 19, a menu screen 100 is displayed by means of the PlayList referenced from the FirstPlayback and the TopMenu via the MovieObject #6. In this example of FIG. 19, buttons 101A to 101F for instructing reproduction of six titles are displayed on the menu screen 100 by using predetermined button image data, and a title 102 of the menu screen 100 is also displayed on the menu screen 100.

When, for example, the button 101A is instructed by a predetermined method, a title with a value "title_id" of 0 and a title number #1 is specified, and a MovieObject #0 is referenced. A PlayList with a file name "00001.mpls" is referenced and reproduction of the PlayList is instructed by means of a navigation command described in the MovieObject #0. Further, a clip corresponding to the PlayList is reproduced.

Let us consider a case of deleting a title from the state shown in FIG. 19. It is assumed that a system of a recording machine is provided as a system for, at the time of title editing, maintaining a sequential order of recording titles as well as changing title indices in response to the editing.

FIG. 20 shows exemplary configurations of a menu screen 100' in the case where a title#3 with a value "title_id" of 2 and a title number #3 has been deleted from the state of FIG. 19 described above, and of titles, MovieObjects, and PlayLists relating to the menu screen 100'. Title indices #3 and subsequent that exist before editing are shifted forwardly one by one along with deletion of the title of the title number #3 from the state of FIG. 19. Along therewith, a MovieObject #3 called from the title of the title number #3 that exists before editing is deleted and then the indices of the MovieObjects #3 and subsequent, the MovieObject #3 being called from the title number #3 that exists before editing, are shifted forwardly one by one. At this time, the contents of the MovieObject with the changed number are not changed. Therefore, the PlayList referenced from each MovieObject does not change before and after editing. The PlayList (file name "00003.mpls") referenced from the deleted MovieObject is deleted.

A specific processing example will be described here. The fact that the title of the title number #3 is deleted with reference to FIGS. 9 and 10 denotes the fact that a block "Title [title_id=2]( )" having a value "title_id" of 2 in a "for" loop statement in which a value "title_id" is defined as a loop variable is deleted in a block "Indexes( )" in an index file "index.bdmv". The number of blocks "Title[title_id]( )" is decremented by 1, and concurrently, a value of a field "number_of_Titles" is reduced by 1. In this manner, the title indices of titles that follow the deleted title are shifted forwardly one by one.

When a block "Title[title_id=2]( )" contained in a block "Indexes( )" is deleted, a MovieObject referenced based on a value of a field "Title_mobj_id_ref[title_id=2]" is also deleted from the block "Title[title_id=2]( )". Referring to FIGS. 11 and 12, in a file "MovieObject.bdmv" as well, a block "MovieObject[mobj_id]( )" having a value "mobj_id" corresponding to a value of a field "Title_mobj_id_ref[title_id=2]" is deleted in a "for" loop statement with a value "mobj_id" defined as a loop variable contained in a block "MovieObjects( )". Here, a reference relationship between titles and MovieObjects is defined as one to one, and thus, a block "MovieObject[mobj_id=2]( )" of which a value "mobj_id" is set to 2 is deleted. Since the number of blocks "MovieObject[mobj_id]( )" is decremented by 1, a value of a field "number_of_mobjs" is concurrently decremented by 1. In this manner, a MovieObject called from a title of the deleted title number #3 is deleted, and MovieObjects that follow the deleted MovieObject are shifted forwardly one by one without a change of contents thereof. Because the contents of MovieObjects do not change, a reference relationship between the MovieObjects and PlayLists does not change as well.

Further, a PlayList referenced from the deleted MovieObject is deleted. At this time, if an attribute of a PlayList to be deleted is "Real", a clip corresponding thereto is also deleted. Along with deletion of the PlayList, an item corresponding to a file name of a PlayList to be deleted in a "for" loop statement is deleted in a block "TableOfPlayLists( )" in an extension data block "ExtensionData( )" contained in an index file "index.bdmv", and then, a value of a field "number_of_PlayLists" is decremented by 1.

A menu is updated along with title deletion. A menu is updated by deleting a menu that exists before editing, and newly creating a menu based on title information, as described above. More specifically, information on a PlayList an attribute of which is defined as "Menu" is retrieved from a field "PlayList_attribute" contained in a block "TableOfPlayLists( )", and then, the retrieved PlayList is deleted. In the example of FIG. 19 described above, a PlayList with a file name "01001.mpls" is deleted. A MovieObject called from a TopMenu and a FirstPlayback (MovieObject #6 in the example of FIG. 19) is deleted based on a block "Indexes( )" of an index file "index.bdmv". Then, the TopMenu and the FirstPlayback are deleted in an index table.

When a menu that exists before editing is deleted, a menu reflecting editing is created. For example, a clip, a MovieObject, and a PlayList for reproducing the menu screen 100' in accordance with a TopMenu that exists after editing are generated. This process is performed as follows, for example.

First, a clip for displaying the menu screen 100' is generated. In this example of FIG. 20, images such as button images of the menu screen 100 that exists before editing, shown in FIG. 19, are used intact to thereby configure a new menu screen 100'. Displayed on the menu screen 100' are five buttons 101A, 101B, 101C', 101D' and 101E' corresponding to title indices #1, #2, #3, #4 and #5, respectively. The generated data is, for example, multiplexed in a predetermined manner, and the multiplexed data is recorded as a clip AV stream file on a disc.

Next, a clip information file corresponding to the clip AV stream file is generated, and further, a PlayList for referencing the clip information file is generated. A file name of the PlayList is determined so as not to overlap, for example, the file name of the existing PlayList and the file name of the PlayList that has existed insofar. In this example, the file name of the PlayList is defined as "01002.mpls".

When a PlayList is generated, a MovieObject for referencing the PlayList is generated. The MovieObject is additionally described in a "for" loop statement contained in a block "MovieObject( )" in a file "MovieObject.bdmv", as described above. Therefore, the MovieObject is defined as a MovieObject #5 that follows a MovieObject #4 referenced from the title of the largest title number.

The MovieObject #5 for reproducing a TopMenu is registered in a block "TopMenu( )" contained in a block "Indexes( )" in an index file "index.bdmv". In other words, referring to FIG. 10, data indicating the MovieObject #5 is described as a filed "TopMenu_mobj_id_ref" contained in the block "TopMenu( )". In addition, a block "First Playback( )" contained in the block "Indexes" in the index file "index.bdmv" is updated. More specifically, in the block "FirstPlayback( )", a value of a field "HDAVC_Title_playback_type is set to a predetermined value, and data indicating the MovieObject #5 for reproducing a TopMenu is described as a field "FirstPlayback_mobj_id_ref".

Then, a block "TableOfPlayLists( )" in an extension data block "ExtensionData( )" in the index file "index.bdmv" is updated. In this example, a value of a field "number_of_PlayLists" is decremented by 1 in the block "TableOfPlay Lists( )". Then, a file name of a newly generated PlayList for reproducing a TopMenu is described as a field "PlayList_file_name", and an attribute of the PlayList is defined as "Menu" and a value indicating the attribute "Menu" is described as a field "PlayList_attribute". In a field "title_id_ref", a value is fixedly set to, for example, "0xFFFFE" in the case where the attribute of the PlayList is "Menu" and the PlayList is referenced from the TopMenu. Then, a value of a field "length" is updated based on the added contents.

An updating process for the files such as "index.bdmv" and "MovieObject.bdmv", long with title editing, is actually defined as a process performed on a work memory of a central processing unit (CPU). For example, when a disc is mounted, a recording machine first reads out an index file "index.bdmv" or a MovieObject file "MovieObject.bdmv" from the disc, and stores these files on the work memory of the CPU. Upon the receipt of a command for editing a menu, the CPU performs the processing to these files stored on the work memory, as described above. These updated files are rewritten onto the disc at a predetermined timing such as a time of disc ejection or a time of turning off the power of the recording machine.

Next, let us consider a case in which the disc recorded with the configuration of FIG. 20 has been mounted on a recording machine designed to maintain a title number assigned at the time of first recording a title, as described above. In this case, the recording machine needs to restore the title number of the title deleted by the above-described processing. The title number can be restored by using information on a field "title_id_ref" contained in a block "TableOfPlayLists( )", defined in one embodiment of the present invention.

FIG. 21 shows exemplary configurations of a menu screen 110 indicating a state in which a title number is restored, and of titles, MovieObjects, and PlayLists relating to the menu screen 110. In the example of FIG. 21, displayed on the menu screen 110 are buttons 111A, 111B, 111D, 111E, and 111F corresponding to titles currently recorded on a disc and a button 111c corresponding a title that was recorded in the past on the disc and has been deleted. It is preferable to notify that, in the case where the button 111C has been selected from the above buttons, a title of a corresponding title number has already been deleted, and does not exist on the disc.

This configuration illustrated in FIG. 21 is schematically created as follows. For example, a field "title_id_ref" contained in a block "TableOfPlayLists( )" is referenced, a title number deleted based on a value "title_id_ref" is restored, and the restored title number is inserted in an index table. Further, a MovieObject and a PlayList corresponding to the restored title number are generated. The PlayList may be a dummy PlayList configured to display the fact that, for example, a title of the title number has been deleted. A clip referenced from the PlayList may be created in a predetermined manner every time the clip is referenced or may be prepared in advance at the system side.

Further, a menu that exists before restoring title indices is deleted to newly create a menu screen 110 reflecting titles with these restored title indices. That is, a PlayList and a MovieObject for reproducing a menu that exists before storing title indices are deleted, and also a FirstPlayback and a TopMenu of an index table are deleted. Then, a PlayList and a MovieObject for reproducing the menu screen 110 are newly created, as well as the created MovieObjects are registered in a TopMenu and a FirstPlayback.

Figure 22:
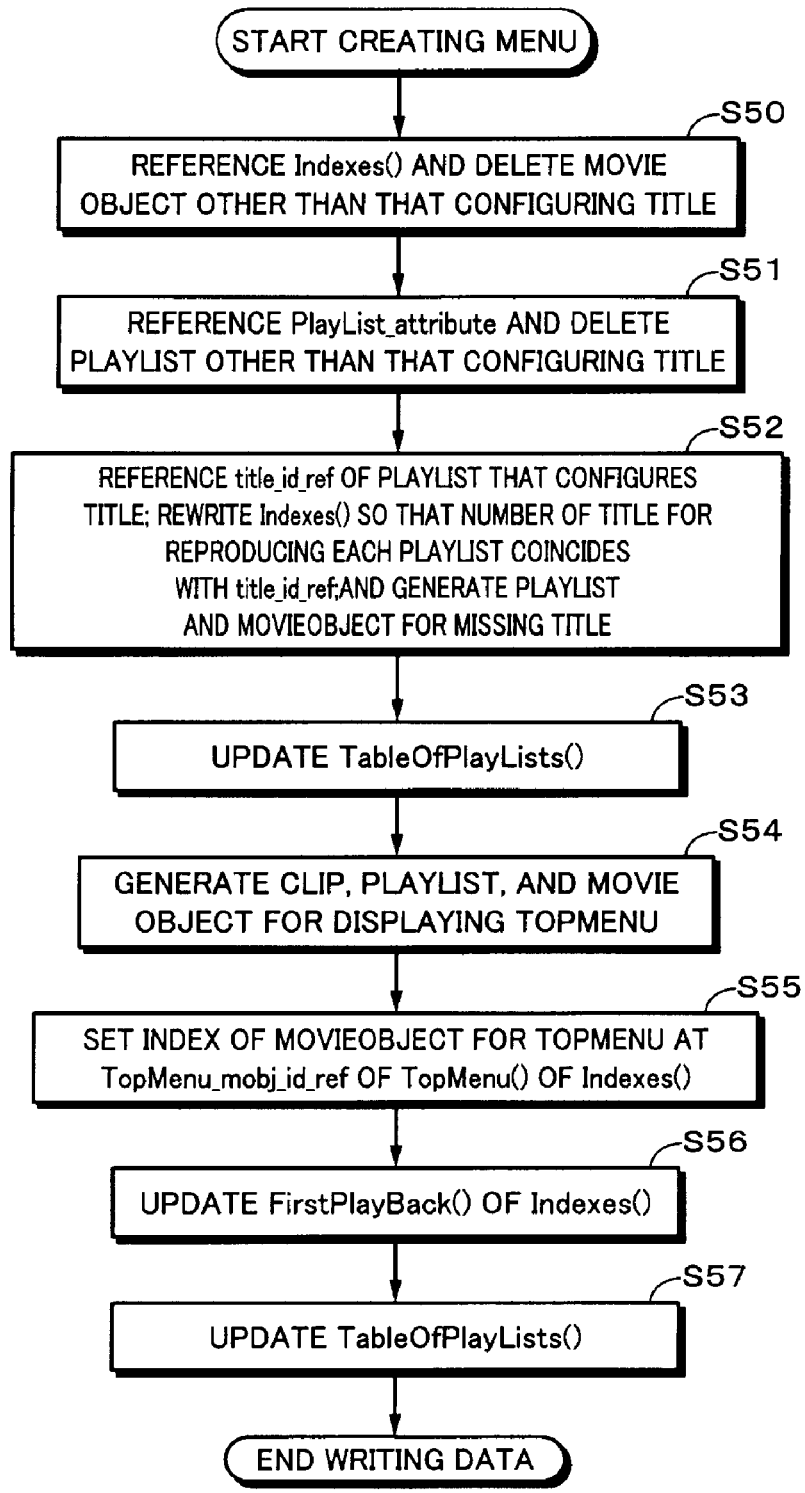
FIG. 22 is a flow chart showing an exemplary process for restoring a title number based on a value "title_id_ref"

FIG. 22 is a flow chart showing an exemplary process for restoring a title number, i.e., a value "title_id" on the basis of a value "title_id_ref". Prior to the process in the flow chart, a title recorded on a mounted disc is deleted by means of editing in a recording machine (referred to as recording machine A) in which the sequential order of recording titles is maintained and no title number is maintained. At this time, it is assumed that recorded on the disc is the arrangement in which the title indices that follow the deleted title number are shifted forwardly as illustrated in FIG. 20 and the MovieObject and PlayList called from the deleted title are deleted. The disc is mounted on a recording machine (referred to as recording machine B) configured to maintain a title number.

When the disc is mounted, the recording machine B first reads an index file "index.bdmv" and a MovieObject file "MovieObject.bdmv". At this time, the recording machine B makes an operation as described below as an example. The recording machine B, for example, references a block "TableOfPlayLists( )" and obtains a value "title_id_ref" of each PlayList in an extension data block "ExtensionData( )" of the index file "index.bdmv". Then, the machine checks whether or not the obtained values "title_id_ref" are continuous values. If the values "title_id_ref" are discontinuous, it can be determined that a title has been deleted in the recording machine A. When it is determined that the title has been deleted, the processes in step S50 to step S57 described below are performed to obtain compatibility with mounting of the recording machine B.

The following processes in step S50 to step S57 are performed for these files "index.bdmv" and "MovieObject.bdmv" read in a memory by means of a central processing unit (CPU) for controlling the recording machine B, for example. The data on the memory after the processes have completed is recorded on a disc at a predetermined timing such as a time of disc ejection or a time of turning off the power of the recording machine B.

Upon start of menu creation, a MovieObject other than that for configuring a title is deleted in step S50 with reference to a block "Indexes( )" contained in an index file "index.bdmv". For example, in the block "indexes( )", a MovieObject indicated in a field "FirstPlaybak_mobj_id_ref" contained in a block "FirstPlayback( )" and a MovieObject indicated in a field "TopMenu_mobj_id_ref" contained in a block "TopMenu( )" are deleted.

In step S51, reference is made to a field "PlayList_attribute" of a block "TableOfPlayLists( )" in an extension data block "ExtensionData( )" contained in an index file "index.bdmv", and a PlayList other than that reproducing a title is deleted. For example, a PlayList in which the field "PlayList_attribute" indicates an attribute "Menu" is deleted.

In the next step S52, with reference to a value "title_id_ref" of a PlayList for reproducing a title, the contents of a block "Indexes( )" are rewritten so that an number of a title for reproducing each PlayList, i.e., a value "title_id" coincides with a value "title_id_ref" of a corresponding PlayList. In other words, in a "for" loop statement of a loop variable "title_id" contained in the block "Indexes( )" of the index file "index.bdmv", a PlayList called from a referenced MovieObject is obtained for each value "title_id". Based on information on the obtained PlayList, the block "TableOfPlayLists( )" is referenced from extension data of an index file to thereby obtain the corresponding value "title_id_ref". The corresponding portion of the block "Indexes( )" is rewritten so that the value "title_id_ref" is defined as a value "title_id" of a reference source.

In this step S52, processing is performed to a title that is deleted and missing in the recording machine A. Since, as for the value title_id_ref, a title number of a title to which it belongs at the time of recording, i.e., a value "title_id" is maintained, the value "title_id_ref" corresponding to the title deleted in the recording machine A is missing. A PlayList corresponding to a value "title_id" that corresponds to this missing value "title_id_ref" is generated. For example, a dummy PlayList can be used as the PlayList. As one example, the PlayList can be defined as a PlayList for displaying that a title of a title number based on the value "title_id" does not exist on a disc. This PlayList is assigned with a file name that does not overlap the file name of the PlayList existing on a disc (file name "00007.mpls" in the example of FIG. 21), and is recorded on the disc.

Further, a MovieObject for reproducing the generated PlayList is generated. The generated MovieObject is additionally generated next to the existing MovieObject in the MovieObject file "MovieObject.bdmv" (MovieObject#5" in the example of FIG. 21). Then, an number of the added MovieObject (for example, a value "mobj_id" in a block "MovieObjects( )" contained in a MovieObject file "MovieObject.bdmv") is set in the field "Title_mobj_id_ref" to which the value "title_id" corresponds, in a block "Indexes( )" of the index file "index.bdmv".

In the next step S53, the block "TableOfPlayLists( )" in the extension data block "ExtensionData( )" contained in the index file "index.bdmv" is updated. That is, in this step S53, information on the dummy PlayList generated in the above step S52 is described in the block "TableOfPlayLists( )".

More specifically, in the block "TableOfPlayLists( )", a value of a field "number_of_PlayLists" is incremented by 1 and a file name of the dummy PlayList generated in the step S52 is described as a field "PlayList_file_name". In addition, an attribute of the PlayList is defined as, for example, "Real", and a value indicating the fact is described as a field "PlayList_attribute". The field "title_id_ref" is defined as a value next to the existing value "title_id_ref". Since in the example of FIG. 21, a maximum value of the existing value "title_id_ref" is 5, a value "title_id_ref" corresponding to the dummy PlayList is set to 6. In addition, a value of a field "length" is updated based on the added contents.

In the next step S54, a clip, a MovieObject, and a PlayList for displaying a TopMenu are generated. This process is performed as follows, for example. First, a clip for displaying a menu screen is generated. For example, image data automatically generated in accordance with a predetermined program can be used as this clip. Without being limited thereto, image data for a menu screen may be prepared and used on a disc or in a recording machine. In addition, the image data used for the menu screen may be mobile image data or still image data. Further, button image data used to instruct title reproduction can be generated similarly. Thumbnail images corresponding to clips used for titles can further be used. The thus generated data is, for example, multiplexed in a predetermined manner, and the multiplexed data is recorded as a clip AV stream file on a disc.

Next, a clip information file corresponding to the clip AV stream file is generated, and further, a PlayList for referencing the clip information file is generated. A file name of a PlayList is determined so as not to overlap the file name of the existing PlayList and the file name of the PlayList that has existed in so far. In the example of FIG. 21, the file name of the PlayList is defined as "01003.mpls".

When the PlayList is generated, a MovieObject for referencing the PlayList is generated. The MovieObject is defined as a MovieObject next to that added in the above step S52 and referencing the dummy PlayList (MovieObject #6 in the example of FIG. 21).

In the next step S55, the MovieObject, created in the step S54 described above, for reproducing the TopMenu, is registered in a block "TopMenu( )" contained in an index file "index.bdmv". In other words, referring to FIG. 10, data indicating the MovieObject is described as a field "TopMenu_mobj_id_ref" contained in the block "TopMenu( )".

In the next step S56, a block "FirstPlayback( )" in the block "Indexes( )" contained in the index file "index.bdmv" is updated. In other words, in the block "FirstPlayback( )", a value of a field "HDAVC_Title_playback_type" is set to a predetermined value, and a value "mobj_id" indicating the MovieObject, created in the step S54 described above, for reproducing a TopMenu, is described as a field "FirstPlayback_mobj_id_ref".

Then, in the next step S57, the block "TableOfPlayLists( )" in the extension data block "ExtensionData( )" contained in the index file "index.bdmv" is updated along with addition of the PlayList for reproducing a TopMenu in the step S54. That is, in this step S57, information on the PlayList for reproducing the TopMenu generated in the above step S54 is described in the block "TableOfPlayLists( )".

More specifically, in the block "TableOfPlayLists( )", a value of the field "number_of_PlayLists" is incremented by 1, and a file name of a newly generated PlayList for reproducing a TopMenu is described as a field "PlayList_file_name". In addition, an attribute of the PlayList is defined as "Menu", and a value indicating the attribute "Menu" is described as a field "PlayList_attribute". A value of a field "title_id_ref" is fixedly set to "0xFFFE" in the case where an attribute of a PlayList is define as "Menu" and the PlayList is referenced from a TopMenu. Then, a value of a field "length" is updated based on the added contents.

While the foregoing description has given a process in the case where a disc with a title edited in the recording machine A provided to maintain the sequential order of recording titles and maintain no title number, has been mounted on the recording machine B provided to maintain a title number, the opposite kind of situation can be presupposed, of course. That is, this is a case in which a disc with a title edited in the recording machine B maintaining a title number has been mounted on the recording machine A in which no title number is maintained.

As one example, let us consider a case in which a title #3 has been deleted from a state in which six titles, titles #1 to #6, have been originally recorded on a disc in the recording machine B. In the recording machine B, it is assumed that a dummy PlayList indicating that the title #3 has been deleted is created along with deletion of the title #3 because a title number is maintained. As described with reference to FIG. 21, a dummy PlayList and a MovieObject for reproducing the dummy PlayList are additionally created for the remaining MovieObjects and PlayLists after a MovieObject and a PlayList referenced from the title #3 are deleted along with deletion of the title #3.

With this configuration of FIG. 21, one MovieObject is called from a title, and one PlayList is referenced from the MovieObject. Thus, this disc can be reproduced in the recording machine A without making any change for titles, MovieObjects, and PlayLists.

The foregoing description has given a process in the case where one title has been deleted from a plurality of titles recorded on a disc, but the embodiment of the invention is not limited thereto. The embodiment of the invention can also be applied to a case in which two or more titles have been deleted. In other words, even in the case where two or more titles have been deleted, a plurality of deleted title indices can be obtained, respectively, based on a value "title_id_ref", and titles of the deleted title indices can be restored, respectively. In addition, the number of MovieObjects and PlayLists equivalent to the number of deleted titles are generated, and the generated MovieObjects and PlayLists are made to correspond to respective ones of the restored titles, respectively.

For example, in the recording machine A, a lastly recorded title may be deleted from a plurality of titles recorded on a disc. In this case, values "title_id_ref" are continuous values, and no missing title number occurs. Therefore, it is believed that, even if the disc is mounted on the recording machine B, no problem occurs in particular in operation such as menu display or addition of a new title.

Now, a description will be given to a recording/reproducing apparatus to which one embodiment of the present invention can be applied. First, a virtual player will be briefly described here. When a disc having the data structure as described above is mounted on the player, the player should convert a command described in a MovieObject or the like read out from the disc into a specific command for controlling hardware inside of the player. The player stores software for carrying out such conversion in advance in a ROM (Read Only Memory) incorporated therein. This software is referred to as a BD virtual player because it causes the player to operate in conformity with the BD-ROM standard via the disc and the player.

Figure 23:
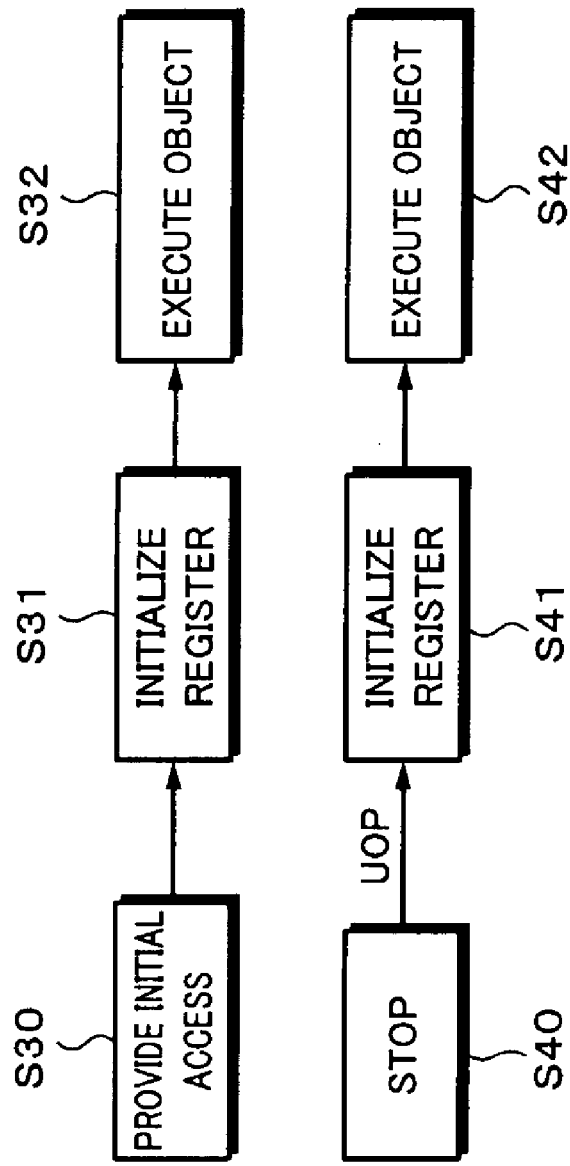
FIGS. 23A and 23B are flow charts schematically depicting an operation of a BD virtual player.

FIGS. 23A and 23B schematically depict an operation of the BD virtual player. FIG. 23A shows an example of operation at the time of disc loading. When the disc is mounted on the player to provide initial access to the disc (step S30), a register, in which shared parameters commonly used in disc 1 are stored, is initialized (step S31). Then, in the next step S32, a program described in a MovieObject or the like is read from the disc, and the read program is executed. The initial access used here denotes that the disc is first reproduced, for example, at the time of disc loading.

FIG. 23B shows an example of operation, for example, in the case where a user depresses a play key to instruct reproducing while the player is inactive. In response to a first inactive state (step S40), the user instructs reproducing by using, for example, a remote control commander (UO: User Operation). When reproducing is instructed, registers, i.e., common parameters are first initialized (step S41). In the next step S42, a process moves to a MovieObject execution phase.

Figure 24:
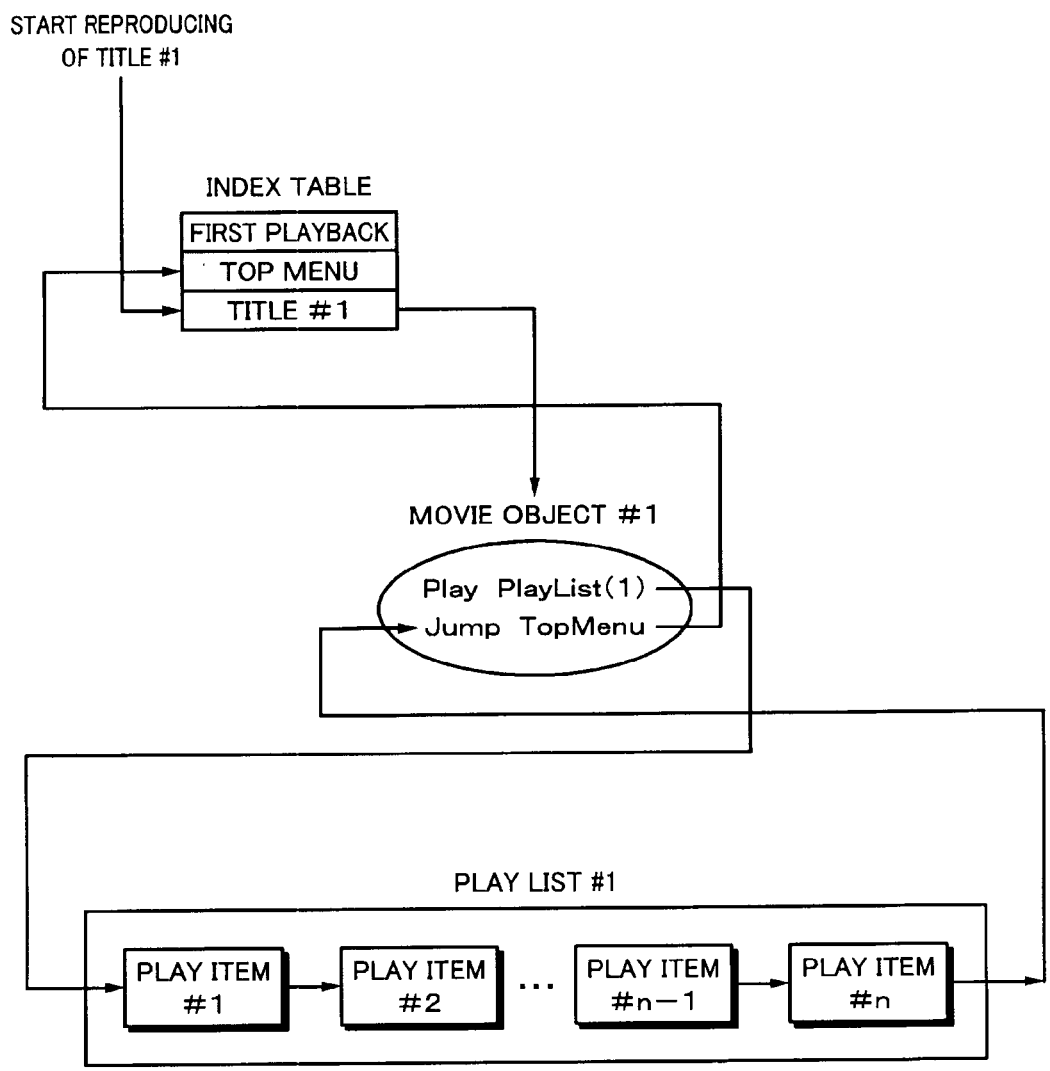
FIG. 24 is a schematic diagram schematically depicting an operation of a BD virtual player.

Referring now to FIG. 24, a description will be given to reproducing of a PlayList in a MovieObject execution phase. Let us consider a case in which an instruction for starting reproducing of contents of a title number #1 is supplied by means of UO or the like. The player references an index table shown in FIG. 4 described above to retrieves a number of an object that corresponds to reproducing of contents of a title #1 in response to an instruction for starting reproducing of contents. For example, assuming that a number of an object for achieving reproducing of contents of the title #1 is #1, the player starts execution of a MovieObject #1.

In this example of FIG. 24, assuming that a program described in the MovieObject #1 is composed of 2 lines and a command of the first line is "Play PlayList (1)", the player starts reproducing of a PlayList #1. The PlayList #1 is composed of one or more PlayItems, and the PlayItems are sequentially reproduced. When reproducing of the PlayItems in the PlayList #1 finishes, processing returns to execution of the MovieObject #1, and then, a command of the second line is executed. In the example of FIG. 24, a command of the second line is defined as "jump TopMenu" and the line is executed, thereby the process of the MovieObject for realizing TopMenu, described in an index table, is started.

Figure 25:
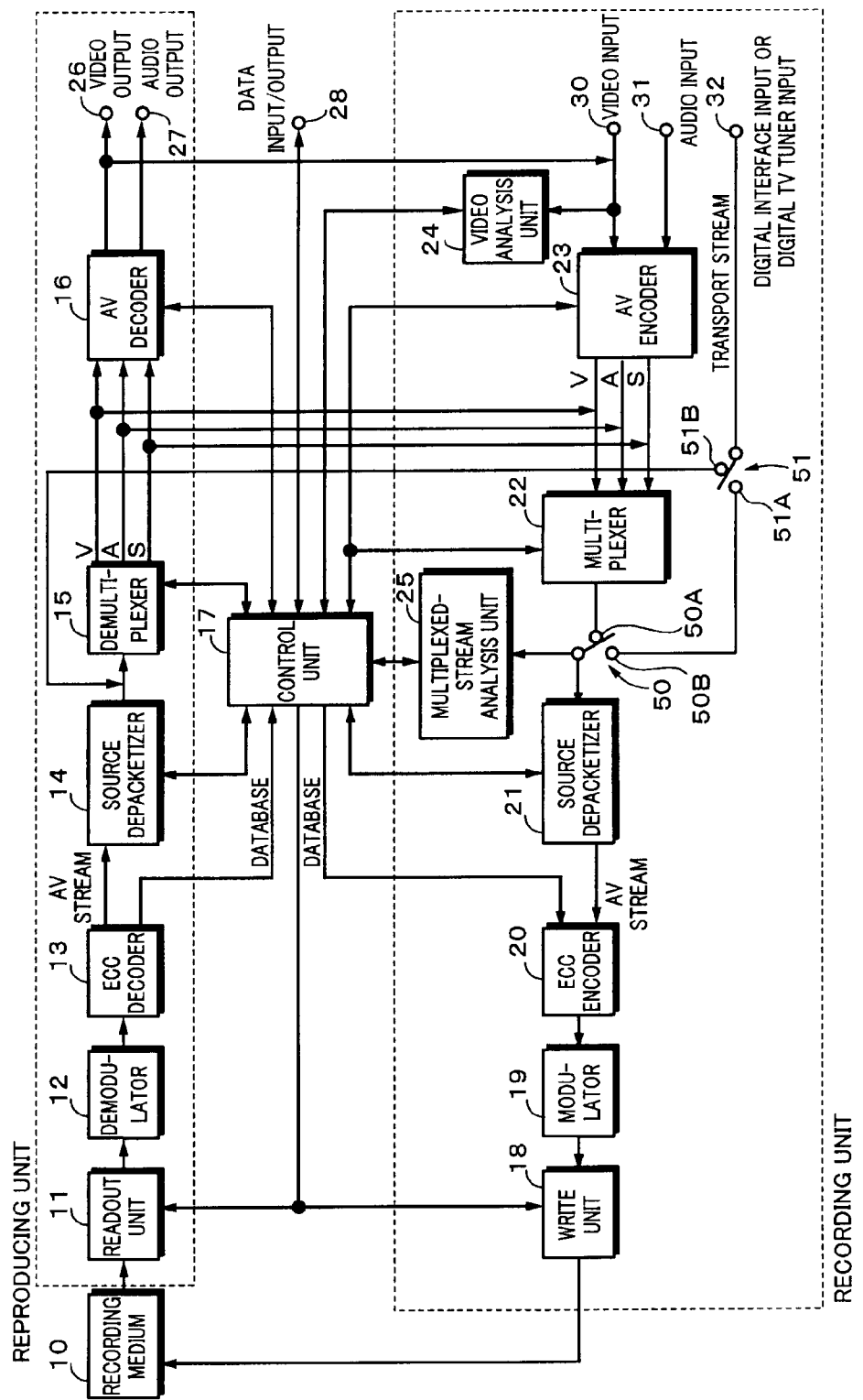
FIG. 25 is a block diagram depicting an exemplary configuration of a recording/reproducing apparatus that can be applied to one embodiment of the present invention.

FIG. 25 shows an exemplary configuration of a recording/reproducing apparatus that is applicable to one embodiment of the invention. The recording/reproducing apparatus can be used as, for example, a recording/reproducing unit of a video camera device. Without being limited thereto, the recording/reproducing apparatus may be configured to be used alone. Here, explanation will be given on the assumption that the recording/reproducing apparatus is used as a recording/reproducing unit of a video camera device. Note that the configuration of the recording/reproducing apparatus exemplified in FIG. 25 can be applied to both the recording machine A provided to maintain the sequential order of recording and maintain no title number and the recording machine B provided to maintain a title number, described above.

A control unit 17 includes, for example, a CPU, a ROM (Read Only Memory), and a RAM (Random Access Memory). The ROM stores in advance data necessary for programs or operations that operate on the CPU. The RAM is used as a work memory of the CPU. The CPU reads out the programs or data stored in the ROM when necessary, and controls the entire recording/reproducing apparatus while using the RAM as a work memory. The above-described BD virtual player is obtained by the control unit 17 in accordance with the programs stored in advance in the ROM, for example.

Equipment-specific information and data, etc. concerning record etc. which are input from a video camera unit (not shown) are input from an input/output terminal 28 to the recording/reproducing apparatus. These items of data input to the input/output terminal 28 are supplied to the control unit 17.

Operating elements such as a variety of switches and data output from a user interface (not shown) having display elements for simply making a display are output from the data input/output terminal 28. In addition, a display control signal generated by the control unit 17 is supplied to the user interface via the data input/output terminal 28. The user interface can also supply the display control signal to a monitor device, such as a television receiver, to display the supplied signal.

First, an operation made at the time of recording will be described here. A video signal obtained by image shooting is input to an input terminal 30 from a video camera unit (not shown), and an audio signal output along with the video signal is input to an input terminal 31. The input video signal and audio signal are supplied to an AV encoder 23. The video signal is also supplied to a video analysis unit 24. The AV encoder 23 encodes the input video signal and audio data in accordance with, for example, an MPEG2 scheme, and outputs an encoded video stream V, an encoded audio stream A, and system information S, respectively.

The AV encoder 23 encodes the audio signal in a format such as an MPEG1 audio stream format or a Dorby AC3 audio stream format. The system information S includes, for example, video signal or audio signal encoding information such as byte size of encoded picture or audio frame or picture encoding type, and time information relating to video and audio synchronization.

These encoded outputs of the AV encoder 23 are supplied to a multiplexer 22. The multiplexer 22 multiplexes the supplied encoded video stream V and encoded audio stream A on the basis of the system information S, and then, outputs a multiplexed stream based on an MPEG2 transport stream. In other words, the encoded video stream V, the encoded audio stream A, and the system information S are divided into sizes of payload of transport packets, respectively, and predetermined headers are added to them, to make transparent packets. In the header, PID is stored in a predetermined manner so that the irrespective data types and the like can be identified.

The multiplexed stream output from the multiplexer 22 is supplied to a source packetizer 21 and a multiplexed-stream analysis unit 25 described above via a switch 50 with a terminal 50A selected. The source packetizer 21 encodes the supplied multiplexed stream in accordance with an application format of a recording medium.

A clip AV stream encoded by the source packetizer 21 is error-corrected by an ECC (error correction coding) encoder unit 20, the error-corrected stream is modulated to a recording code by a modulator unit 19, and the modulated code is supplied to a write unit 18. The write unit 18 records the clip AV stream modulated to the recording code by the modulator unit 19 in a recordable recording medium 10 in response to an instruction of a control signal supplied from the control unit 17.

The recording/reproducing apparatus can directly input a transport stream obtained by multiplexing a clip AV stream, and record the input stream in a recording medium. For example, a transport stream by a digital television broadcast or the like, output from a digital interface or a digital television tuner, is input to an input terminal 32.

Examples of a method for recording the input transport stream may include a method for transparently recording the stream and a method for re-encoding and for the purpose of lowering a recording bit rate or the like and then recording the stream. An instruction indicating which of these two recording methods is used for recording is issued by means of, for example, an user operation relevant to a user interface, and a control signal according to this operation is supplied to the control unit 17 via the data input/output terminal 28. The control unit 17 controls each unit of the recording/reproducing apparatus on the basis of the control signal, and consequently, controls the recording method.

In the case where the input transport stream is recorded transparently, a terminal 50B is selected in the switch 50 and a terminal 51A is selected in a switch 51. The transport streams input from the input terminal 32 are supplied to the source packetizer 21 and the multiplexed-stream analysis unit 25, respectively, via the switches 51 and 50. The subsequent processes are identical to those in the case of encoding and recording the video signal and audio signal input to the input terminals 30 and 31 described above.

In the case where the input transport stream is re-encoded and recorded, on the other hand, a terminal 51B is selected in the switch 51, and the transport stream input from the input terminal 32 is supplied to a demultiplexer 15. The demultiplexer 15 demultiplexes the encoded video stream V, the encoded audio stream A, and the system information S that are multiplexed in the supplied transport stream, and supplies the encoded video stream V to an AV decoder 16 as well as supplies the encoded audio stream A and the system information S to the multiplexer 22.

An AV decoder 16 decodes the encoded video stream V supplied from the demultiplexer 15, and supplies the decoded video signal to the AV encoder 23. The AV encoder 23 encodes the thus supplied video signal as an encoded video stream V. The encoded video stream V is supplied to the multiplexer 22.

The multiplexer 22 multiplexes the encoded video stream V encoded and supplied by the AV encoder 23 and the encoded audio stream A demultiplexed by the demultiplexer 15 on the basis of the system information S also demultiplexed by the demultiplexer 15, and then, outputs a multiplexed stream. The subsequent processes are identical to those in the case of encoding and recording the video signal and audio signal that are input to the input terminals 30 and 31, described above.

The recording/reproducing apparatus records a clip AV stream file, as described above, in a recording medium 10 that conforms to the BD-RE standard, for example, and further records application database information associated with the clip AV stream file to be recorded. The application database information is created by the control unit 17 on the basis of feature information on movie images from the video analysis unit 24, feature information on clip AV streams from the multiplexed-stream analysis unit 25, and user instruction information input from the terminal 28.

The feature information on movie images, obtained from the video analysis unit 24, is information created in the recording/reproducing apparatus in the case where a video signal is encoded and recorded by the AV encoder 23. The video analysis unit 24 is supplied with a video signal input from the input terminal 30 or a video signal obtained by demultiplexing the transport stream input from the input terminal 32 with the demultiplexer 15 and then by decoding the demultiplexed transport stream with the AV decoder 16. The video analysis unit 24 analyzes the contents of the supplied video signal, and generates information on an image of characterizing mark points in the input video signal. For example, the video analysis unit 24 detects characterizing mark points such as a start point of a program in an input video signal, a scene change point, or start and end points of a CM (commercial) broadcast, to thereby obtain specifying information of the image of the detected mark points. In addition, a thumbnail image of the image of the mark points may be created. The thumbnail image is provided as an image of reduced size by subjecting actual image data to a decimating process or the like. A position of the thumbnail image on the clip AV stream can be indicated by PTS.

The specifying information of these images, thumbnail images, and positional information of the thumbnail images (for example, PTS) are supplied to the multiplexer 22 via the control unit 17. At the time of multiplexing an encoded picture obtained by encoding the image of the mark points instructed from the control unit 17, the multiplexer 22 returns address information, of the encoded picture on a clip AV stream, to the control unit. The control unit 17 associates types of characterizing images with address information of a corresponding encoded picture on a clip AV stream, and stores the associated result in a RAM, for example.

The feature information on the clip AV stream, obtained from the multiplexed-stream analysis unit 25, is information associated with encoding information on the clip AV stream to be recorded. The information is generated in the movie image recording/reproducing apparatus. For example, with respect to the clip AV stream, a time stamp of an entry point and address information corresponding thereto are included as the feature information on the clip AV stream. In addition, with respect to the clip AV stream, discontinuous information on system time clock (STC), change information on the contents of programs, and address information corresponding to an arrival time, or other information are included as the feature information on the clip AV stream.

In the case where the transport stream input from the input terminal 32 is recorded transparently, the multiplexed-stream analysis unit 25 detects a characterizing mark point image contained in the clip AV stream, and generates type and address information of the detected image. The information serves as data stored in a block "ClipMark" contained in a clip information file. In this manner, feature information on the clip AV stream obtained by the multiplexed-stream analysis unit 25 is stored in the clip information file that serves as a database of the clip AV stream. These items of information obtained by the multiplexed-stream analysis unit 25 are temporarily stored in a PAM of the control unit 17, for example.

A user instruction information issued to a user interface (not shown) is supplied from the data input/output terminal 28 to the control unit 17. The instruction information includes, for example, specification information of a reproducing section favored by the user in the clip AV stream, character strings for explaining the contents of the reproducing section, and time stamps in the clip AV stream of book mark points or resume points set at the user's favorite scenes. These items of the user instruction information are temporarily stored in the RAM of the control unit 17. On the recording medium 10, these items of the instruction information are stored in a database possessed by a PlayList.

The control unit 17 creates a clip AV stream database (clip information), a PlayList database (PlayList file), management information relevant to the recorded contents on a recording medium (index file), and thumbnail information on the basis of the above-described input information stored on a RAM, i.e., feature information on movie images obtained from the video analysis unit 24, feature information on clip AV streams obtained from the multiplexed-stream analysis unit 25, and the user instruction information input from the data input/output terminal 28.

Here, the control unit 17 can create extension data for extending an index file, a PlayList file, and/or a clip information file on the basis of equipment specific data or information concerning record that are input from the data input/output terminal 28 described above, at the time of creating an index file. Accordingly, the control unit 17 embeds extension data in a file in accordance with the processes as described with reference to the flow chart of FIG. 15, on the basis of the data input from the data input/output terminal 28.

These items of database information are read out from the RAM of the control unit 17. In the same manner as that for the clip AV stream, the readout items of the information are supplied from the control 17 to the ECC encoder unit 20 to be error-corrected, the error-corrected information is modulated to a recording code by the modulator unit 19, and the modulated code is supplied to the write unit 18. The write unit 18 records the database information modulated to the recording code on the recording medium 10 on the basis of a control signal supplied from the control unit 17.

Now, an operation made at the time of reproducing will be described here. On the recording medium 10, application database information including a clip AV stream file, a PlayList file, and an index file, and a MovieObject file, which are created in the same manner as in the operation made at the time of recording, are recorded. When the recording medium 10 is mounted on a drive unit (not shown) the control unit 17 first instructs the readout unit 11 to read out the application database information and the MovieObject file that have been recorded on the recording medium 10. Upon the receipt of this instruction, the readout unit 11 reads out the application database information and the MovieObject file from the recording medium 10. An output from the readout unit 11 is supplied to a demodulator unit 12.

The demodulator unit 12 demodulates the output from the readout unit 11 and decodes a recording code as digital data. An output from the demodulator unit 12 is supplied to an ECC decoder unit 13, an error correction code is decoded, and then, an error correcting process is carried out. The error-corrected application database information is supplied to the control unit 17.

The control unit 17 outputs a menu screen for displaying a list of titles recorded on the recording medium 10 to a user interface via the user interface input/output terminal 28 on the basis of the application database information and the MovieObject file. This menu screen is displayed in a predetermined manner at, for example, a display unit provided at the user interface. The user selects a desired title to be reproduced on the basis of the menu screen, then an operation is performed on the user interface such that the selected title is reproduced. A control signal according to this operation is output from the user interface, and is supplied to the control unit 17 via the terminal 28.

In response to the control signal, the control unit 17 instructs the readout unit 11 to read out a clip AV stream file necessary for reproducing the selected title, on the basis of the contents of the index file or MovieObject file. In accordance with this instruction, the readout unit 11 reads out the clip AV stream file from the recording medium 10. An output from the readout unit 11 is supplied to the demodulator unit 12. The demodulator unit 12 demodulates the supplied signal, decodes a recording code, outputs the decoded recording code as digital data, and supplies the output digital data to the ECC decoder unit 13. The ECC decoder unit 13 decodes an error correction code of the supplied digital data to carry out error correction. The error-corrected clip AV stream file is subjected to a process of a file system unit (not shown) provided by the control unit 17, and then, the processed stream file is supplied to a source depacketizer 14.

The source de-packetizer 14 converts the clip AV stream file recorded on the application format on the recording medium 10 to a stream of a format that can be input to a demultiplexer 15, under the control of the control unit 17. For example, the source depacketizer 14 breaks the MPEG2 transport stream reproduced from the recording medium 10, in units of source packets, removes a header from the source packet, and then transport-packetizes the source packet. The thus transport-packetized clip AV stream is supplied to the demultiplexer 15.

The demultiplexer 15 outputs a video stream V, an audio stream A, and system information S that configure a reproducing section (PlayItem) specified by the control unit 17, of the clip AV stream supplied from the source depacketizer 14, and supplies the streams and information to the AV decoder 16 under the control of the control unit 17. For example, the demultiplexer 15 screens the supplied transport packets based on PID, removes a transport header from a respective one of the screened packets, and outputs the header-removed packets. The AV decoder 16 decodes the supplied video stream V and audio stream A, and leads out the decoded reproducing video signal and reproducing audio signal to a video output terminal 26 and an audio output terminal 27, respectively.

A description will be briefly given to a process in the case where a disk on which processing such as recording has been made in another recording/reproducing apparatus is mounted in the recording/reproducing apparatus. A description will be given to the case where the recording/reproducing apparatus is provided as an apparatus that is a type of the recording machine B described above, the apparatus being configured to maintain a title number at the time of editing a title or the like. The recording/reproducing apparatus that is a type of the recording machine B needs to know whether or not editing has been performed so as not to maintain a title number for a mounted disc.

By way of example, when a disc is mounted, the recording/reproducing apparatus first reads, for example, an index file "index.bdmv" and a MovieObject file "MovieObject.bdmv", obtains information on a MovieObject called from each title with reference to a block "Indexes( )", and references the MovieObject file "MovieObject.bdmv" based on the obtained information to thereby acquire information on the PlayList referenced from each MovieObject.

Let us consider the state of FIG. 21, as an example. In the case where a value "title_id" corresponding to a title number of each title is different from a sequential order of MovieObjects called from titles (value "mobj_id" of a "for" loop statement of a loop variable "mobj_id" in a block "Movie Objects( )" contained in a MovieObject file "MovieObject.bdmv"), it is possible to determine that the recording/reproducing apparatus that is of type of the recording machine A has performed editing such as title deletion.

Without being limited thereto, it is presupposed that information on a recording machine having performed recording lately or information relevant to the edited contents is described in a predetermined location, for example, an extension data block "ExtensionData( )" of an index file "index.bdmv". In this case, it is determined whether or not the recording machine having performed recording lately is a type of the recording machine A. When the determination result is positive, it is possible to determine whether or not editing has been performed so as to delete a title without maintaining a title number on the basis of determination of whether or not values "title_id ref" are continuous values, as described above.

If it is determined that the recording/reproducing apparatus that is a type of the recording machine A has performed editing such as title edition on a mounted disc, processes for restoring a title and updating a menu based on a value "title_id_ref" are performed by means of the processes as described with reference to FIGS. 21 and 22.

While the foregoing description has given that the recording/reproducing apparatus shown in FIG. 25 is provided as an apparatus for recording video data and audio data outputted from a video camera etc. on the recording medium 10, the recording/reproducing apparatus is not limited thereto. For example, one embodiment of the present invention can be applied to an editor device for editing input video data so as to output the edited video data. Further, the configuration of FIG. 25 described above can be provided as a recording apparatus with constituent elements of the reproducing unit side eliminated. Furthermore, while a description has given that the recording medium 10 is provided as a disc-shaped recording medium that conforms with the BD-ROM standard, one embodiment of the present invention can also be applied to another recording medium such as a semiconductor memory or a hard disk without being limited thereto.

While the foregoing description has given that the recording/reproducing apparatus shown in FIG. 25 is configured as hardware, the recording/reproducing apparatus is not limited thereto. That is, it is possible to configured, as software, parts of the recording/reproducing apparatus other than mechanical parts such as a drive unit on which the recording medium 10 is actually to be mounted. In this case, the software is stored in advance on, for example, a ROM of the control unit 17. Without being limited thereto, a mobile image recording/reproducing apparatus can also be configured on a computer such as a personal computer. In this case, the software causing the computer to execute the mobile image recording/reproducing apparatus is provided while it is recorded on a recording medium such as a COD-ROM or a DVD-ROM. In the case where the computer can be connected via a network, the software can be provided via a network such as the Internet.

Further, the foregoing description has given that the present invention is applied to a recording apparatus or a recording/reproducing apparatus for recording content data on a recording medium, but not limited thereto. The present invention can be applied to equipment such as an editor device for editing content data and reproduction control information (such as index files, MovieObjects, PlayLists, and clip information files) on the content data, the equipment having no means for recording content data on a recording medium nor means for reproducing content data from the recording medium. In this case, for example, it is presupposed that data is read out from or written onto the recording medium by means of a recording/reproducing apparatus connected to the editor device. The editor device may edit such as deletion or addition in units of titles. Of course, the editor device may be capable of performing further detailed editing.

It should be understood by those skilled in the art that various modifications, combinations, sub-combinations and alterations may occur depending on design requirements and other factors insofar as they are within the scope of the appended claims or the equivalents thereof.

What is claimed is:

1. A recording/reproducing apparatus for recording at least content data and reproduction control information for controlling reproduction of the content data on a recording medium and reproducing the data recorded on the recording medium, the recording/reproducing apparatus comprising:
a recording unit which records content data on a recording medium;
a reproducing unit which reproduces the data from the recording medium; and
a control unit which makes a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, and which controls recording by the recording unit and reproduction by the reproducing unit,
wherein the control unit controls the recording unit so as to, in response to recording of the content data on the recording medium, generate a table for storing information that indicates the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs, and to record the clip information file, the PlayList file, the object file, the index file, and the table on the recording medium, and
when at the time of reproducing the content data from the recording medium by the reproducing unit, an arrangement of the titles on the index table, read out from the recording medium, does not correspond to an arrangement of information stored in the table and indicating the titles on the PlayList file other than the PlayList file for reproducing a menu, the control unit controls reproduction of the PlayLists included in the PlayList file to be performed in response to the arrangement of the titles on the index table.

2. A recording/reproducing apparatus according to claim 1, wherein the control unit makes a control to further store, in the table, information for identifying the PlayList file and information indicating a type based on a purpose of generating the PlayList file.

3. A recording/reproducing apparatus according to claim 1, wherein the control unit makes a control to generate a display control signal causing a display signal for displaying a list of the titles to be generated in accordance with the arrangement of the titles on the index table.

4. A recording/reproducing apparatus according to claim 1, wherein the index table and the table are recorded at different positions of the index file.

5. A recording/reproducing method for recording at least content data and reproduction control information for controlling reproduction of the content data on a recording medium and reproducing the data recorded on the recording medium, the recording/reproducing method comprising the steps of:

recording content data on a recording medium;

reproducing the data from the recording medium; and making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, and controlling recording by the recording step and reproduction by the reproduction step, wherein the control step controls the recording step so as to, in response to recording of the content data on the recording medium, generate a table for storing information that indicates the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs, and to record the clip information file, the PlayList file, the object file, the index file, and the table on the recording medium, and when at the time of reproducing the content data from the recording medium by the reproduction step, an arrangement of the titles on the index table, read out from the recording medium, does not correspond to an arrangement of information stored in the table and indicating the titles on the PlayList file other than the PlayList file for reproducing a menu, the control step controls reproduction of the PlayLists included in the PlayList file to be performed in response to the arrangement of the titles on the index table.

6. A computer readable medium including computer executable instructions which cause a computer to execute a recording/reproducing method for recording at least content data and reproduction control information for controlling reproduction of the content data on a recording medium and reproducing the data recorded on the recording medium, the recording/reproducing method comprising the steps of:

recording content data on a recording medium;

reproducing the data from the recording medium; and making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, and controlling recording by the recording step and reproduction by the reproduction step, wherein the control step controls the recording step so as to, in response to recording of the content data on the recording medium, generate a table for storing information that indicates the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs, and to record the clip information file, the PlayList file, the object file, the index file, and the table on the recording medium, and when at the time of reproducing the content data from the recording medium by the reproduction step, an arrangement of the titles on the index table, read out from the recording medium, does not correspond to an arrangement of information stored in the table and indicating the titles on the PlayList file other than the PlayList file for reproducing a menu, the control step controls reproduction of the PlayLists included in the PlayList file to be performed in response to the arrangement of the titles on the index table.

7. An information processing apparatus for recording at least content data and reproduction control information for controlling reproduction of the content data on a recording medium, the information processing apparatus comprising:

a recording unit which records content data on a recording medium; and an editing apparatus for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing apparatus comprising:

a control unit which makes a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, wherein the control unit makes a control to generate a table for storing information that indicates the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs, and when an arrangement of the titles on the index table does not correspond to an arrangement of information stored in the table and indicating the titles on the PlayList file other than the PlayList file for reproducing a menu, the control unit controls the arrangement of the titles on the index table to be changed based on the information stored in the table and indicating the titles to which the PlayList files belong at the time of generation of the PlayList files.

8. An information processing apparatus according to claim 7, wherein the control unit makes a control to further store, in the table, information for identifying the PlayList file and information indicating a type based on a purpose of generating the PlayList file.

9. An information processing apparatus according to claim 7, wherein the index table and the table are recorded at different positions of one index file.

10. A recording method for recording at least content data and reproduction control information for controlling reproduction of the content data on a recording medium, the recording method comprising:

making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title for calling the object is to be described;

making a control to generate a table for storing information that indicates the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs; and when an arrangement of the titles on the index table does not correspond to an arrangement of information stored in the table and indicating the titles on the PlayList file other than the PlayList file for reproducing a menu, controlling the arrangement of titles on the index table to be changed based on the information stored in the table and indicating the titles to which the PlayList files belong at the time of generation of the PlayList files.

11. A computer readable medium including computer executable instructions which cause a computer to execute a recording method for recording at least content data and reproduction control information for controlling reproduction of the content data on a recording medium, the recording method comprising:

making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title for calling the object is to be described;

making a control to generate a table for storing information that indicates the titles to which the PlayList files belong at the time of generation of the PlayList files in the sequential order of recording the PlayList files with respect to a respective one of the PlayList files in a Table of PlayLists entry in the table; and when an arrangement of the titles on the index table does not correspond to an arrangement of information stored in the table and indicating the titles on the PlayList file other than the PlayList file for reproducing a menu, controlling the arrangement of titles on the index table to be changed based on the information stored in the table and indicating the titles to which the PlayList files belong at the time of generation of the PlayList files, and further the Table of PlayLists entry including a field Number of PlayLists indicating a number of playlists in the table, the field Number of PlayLists including a subfield indicating title IDs of the titles to which the PlayList belongs.

12. An information processing apparatus for recording at least content data and reproduction control information for controlling reproduction of the content data on a recording medium, the information processing apparatus comprising:

a recording unit which records content data on a recording medium; and an editing apparatus for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing apparatus comprising:

a control unit which makes a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title of calling the object is to be described, wherein the control unit makes a control to generate a table for storing information that indicates the titles to which the PlayList files belong at the time of generation of the PlayList files in the sequential order of recording the PlayList files with respect to a respective one of the PlayList files in a Table of PlayLists entry in the table, and further, the Table of PlayLists entry including a field Number of PlayLists indicating a number of playlists in the table, the field Number of PlayLists including a subfield indicating title IDs of the titles to which the PlayList belongs, and when, based on the information stored in the table and indicating the titles, it is determined that there is a title of which number is missing with respect to the generated PlayList file in an arrangement of the titles on the index table, the control unit makes a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

13. An information processing apparatus according to claim 12, wherein the control unit makes a control to further store information for identifying the PlayList and information indicating a type based on a purpose of generating the PlayList.

14. An information processing apparatus according to claim 12, wherein the index table and the table are recorded at different positions of one index file.

15. A recording method for recording at least content data and reproduction control information for controlling reproduction of the content data on a recording medium, the recording method comprising:
making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table a title of calling the object is to be described;
making a control to generate a table for storing information that indicates the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs; and
when, based on the information stored in the table and indicating the titles, it is determined that there is a title of which number is missing with respect to the generated PlayList file in an arrangement of the titles on the index table, making a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

16. A computer readable medium including computer executable instructions which cause a computer to execute a recording method for recording at least content data and reproduction control information for controlling reproduction of the content data on a recording medium, the recording method comprising:
making a control to generate, with respect to the content data recorded on the recording medium, a clip information file that includes clip information indicating attribute information on the content data, a PlayList file that includes a PlayList for calling the clip information, an object file that includes an object indicating a method for reproducing the content data for calling the PlayList, and an index file that includes an index table in which a title for calling the object is to be described;
making a control to generate a table for storing information that indicates the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs; and
when, based on the information stored in the table and indicating the titles, it is determined that there is a title of which number is missing with respect to the generated PlayList file in an arrangement of the titles on the index table, making a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

17. An editing apparatus for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing apparatus comprising:
a control unit which controls, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs,
wherein, when an arrangement of the titles on the index table does not correspond to an arrangement of information stored in the table and indicating the titles on the PlayList file other than the PlayList file for reproducing a menu, the control unit controls reproduction of the PlayLists included in the PlayList file to be performed in response to the arrangement of the titles on the index table.

18. An editing apparatus according to claim 17, wherein, when the arrangement of the titles on the index table does not correspond to the arrangement of information stored in the table and indicating the titles on the PlayList file other than the PlayList file for reproducing a menu, the control unit makes a control so as not to change the clip information, the PlayList, the object, and the index table.

19. An editing apparatus according to claim 17, wherein the index table and the table are recorded at different positions of one index file.

20. An editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing method comprising:

controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs; and when an arrangement of the titles on the index table does not correspond to an arrangement of information stored in the table and indicating the titles on the PlayList file other than the PlayList file for reproducing a menu, controlling reproduction of the PlayLists included in the PlayList file to be performed in response to the arrangement of the titles on the index table.

21. A computer readable medium including computer executable instructions which cause a computer to execute an editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing method comprising:

controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs; and when an arrangement of the titles on the index table does not correspond to an arrangement of information stored in the table and indicating the titles on the PlayList file other than the PlayList file for reproducing a menu, controlling reproduction of the PlayLists included in the PlayList file to be performed in response to the arrangement of the titles on the index table.

22. An editing apparatus for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing apparatus comprising:

a control unit which controls, with respect to content data, in an editable manner a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs, wherein, when an arrangement of the titles on the index table does not correspond to an arrangement of information stored in the table and indicating the titles on the PlayList file other than the PlayList file for reproducing a menu, the control unit controls the arrangement of the titles on the index table to be changed based on the information stored in the table and indicating titles to which the PlayList files belong at the time of generation of the PlayList files.

23. An editing apparatus according to claim 22, wherein the index table and the table are recorded at different positions of one index file.

24. An editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing method comprising:

controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs; and when an arrangement of the titles on the index table does not correspond to an arrangement of information indicating the titles on the PlayList file other than the PlayList file for reproducing a menu, stored in the table, controlling the arrangement of the titles on the index table to be changed based on the information stored in the table and indicating titles to which the PlayList files belong at the time of generation of the PlayList files.

25. A computer readable medium including computer executable instructions which cause a computer to execute an editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing method comprising:

controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs; and when an arrangement of the titles on the index table does not correspond to an arrangement of information stored in the table and indicating the titles on the PlayList file other than the PlayList file for reproducing a menu, controlling the arrangement of the titles on the index table to be changed based on the information stored in the table and indicating titles to which the PlayList files belong at the time of generation of the PlayList files.

26. An editing apparatus for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing apparatus comprising:

a control unit which controls, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described, and a table having stored therein information indicating the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs, wherein when, based on the information stored in the table and indicating the titles, it is determined that there is a title of which number is missing with respect to the generated PlayList file in an arrangement of the titles on the index table, the control unit makes a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

27. An editing apparatus according to claim 26, wherein the index table and the table are recorded at different positions of one index file.

28. An editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing method comprising:

controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs; and when, based on the information stored in the table and indicating the titles, it is determined that there is a title of which number is missing with respect to the generated PlayList file in an arrangement of the titles on the index table, making a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

29. A computer readable medium including computer executable instructions which cause a computer to execute an editing method for editing in units of titles a data structure that includes: content data; a clip information file that includes clip information indicating attribute information on the content data; a PlayList file that includes a PlayList for calling the clip information; an object file that includes an object indicating a method for reproducing the content data for calling the PlayList; an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files, the editing method comprising:

controlling, with respect to content data, in an editable manner a clip information file that includes clip information indicating attribute information on the content data, a PlayList file that includes a PlayList for calling the clip information, an object file that includes an object indicating a method for reproducing the content data for calling the PlayList, an index file that includes an index table in which a title for calling the object is to be described; and a table having stored therein information indicating the titles to which the PlayList files belong at the time of generation of the PlayList files in the sequential order of recording the PlayList files with respect to a respective one of the PlayList files in a Table of PlayLists entry in the table, and further the Table of PlayLists entry including a field Number of PlayLists indicating a number of playlists in the table, the field Number of PlayLists including a subfield indicating title IDs of the titles to which the PlayList belongs; and when, based on the information stored in the table and indicating the titles, it is determined that there is a title of which number is missing with respect to the generated PlayList file in an arrangement of the titles on the index table, making a control to generate the title of which number is missing in accordance with the sequential order of recording the PlayList files based on the information indicating the titles to which the PlayList files belong at the time of generation of the PlayList files, and to newly generate the object and the PlayList file that correspond to the generated title.

\* \* \* \* \*